(12) United States Patent
Suleiman et al.

(10) Patent No.: US 11,479,692 B2
(45) Date of Patent: Oct. 25, 2022

(54) METAL OXIDE-CONTAINING SOL-GEL COATING FORMULATIONS

(71) Applicant: KING FAHD UNIVERSITY OF PETROLEUM AND MINERALS, Dhahran (SA)

(72) Inventors: Rami Khalid Suleiman, Dhahran (SA); Bassam El Ali, Dhahran (SA); Ahmad Sorour, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 96 days.

(21) Appl. No.: 16/142,483

(22) Filed: Sep. 26, 2018

(65) Prior Publication Data
US 2020/0095465 A1 Mar. 26, 2020

(51) Int. Cl.
| | |
|---|---|
| *C09D 5/08* | (2006.01) |
| *C09D 183/08* | (2006.01) |
| *C09D 7/61* | (2018.01) |
| *C09D 183/04* | (2006.01) |
| *C08G 77/16* | (2006.01) |
| *C08K 3/22* | (2006.01) |

(52) U.S. Cl.
CPC ............. *C09D 183/08* (2013.01); *C09D 5/08* (2013.01); *C09D 7/61* (2018.01); *C08K 3/22* (2013.01); *C08K 2003/222* (2013.01); *C08K 2003/2206* (2013.01); *C08K 2003/2227* (2013.01); *C08K 2003/2255* (2013.01); *C08K 2003/2296* (2013.01)

(58) Field of Classification Search
None
See application file for complete search history.

(56) References Cited

U.S. PATENT DOCUMENTS

| | | | |
|---|---|---|---|
| 8,187,707 B2 | 5/2012 | Van Benthem et al. | |
| 2017/0283316 A1* | 10/2017 | Meuler | B05D 5/08 |
| 2018/0072832 A1 | 3/2018 | Armon et al. | |

FOREIGN PATENT DOCUMENTS

| | | |
|---|---|---|
| CN | 104768746 B | 8/2016 |
| CN | 107088366 A | 8/2017 |
| EP | 1 347 024 B1 | 3/2009 |
| KR | 10-2008-0087399 A | 10/2008 |

OTHER PUBLICATIONS

Rita Bacelar Figueira, et al., "Organic-inorganic hybrid sol-gel coatings for metal corrosion protection: a review of recent progress", Journal of Coatings Technology and Research, vol. 12, No. 1, 2015, pp. 1-35.

Shuwang Duo, et al., "Polydimethyisiloxane/silica hybrid coatings protecting Kapton from atomic oxygen attack", Materials Chemistry and Physics, vol. 112, No. 3, 2008, pp. 1093-1098.

Carmen Salazar Hernández, et al., "DBTL as neutral catalyst on TEOS/PDMS anticorrosive coating", Journal of sol-gel Science and Technology, vol. 81, Issue 2, Feb. 2017, pp. 405-412 (Abstract only).

Yu-Hsuen Lee, et al., "Corrosion protection of carbon steel by different alkoxysilanes via sol-gel method", http://spirit.tku.edu.tw:8080, 2018, pp. 1-8.

* cited by examiner

*Primary Examiner* — Sheeba Ahmed
(74) *Attorney, Agent, or Firm* — Oblon, McClelland, Maier & Neustadt, L.L.P.

(57) ABSTRACT

Sol-gel coating formulations including metal oxide particles such as aluminum oxide, calcium oxide, zinc oxide, magnesium oxide, and molybdenum oxide embedded in a hybrid polymer matrix based on a reacted form of a resin composition containing a tetraalkylorthosilicate, an aminoalkylsilane, a dialkoxysilane, and a silanol terminated polydimethylsiloxane. The sol-gel coating formulations are suitable for applications such as anticorrosive protective coatings of metal substrates (e.g. mild steel). These anticorrosive coated metal substrates are evaluated on their hydrophobicity (water contact angle), surface roughness, mechanical strength (e.g. hardness), adhesiveness to the substrate (e.g. critical load), and anticorrosiveness upon exposure to a saline solution (e.g. impedance value).

20 Claims, 11 Drawing Sheets

Hybrid polymer FT

METAL OXIDE-CONTAINING SOL-GEL COATING FORMULATIONS

STATEMENT OF FUNDING ACKNOWLEDGEMENT

This project was funded by King Fahd University of Petroleum and Minerals (KFUPM), Saudi Arabia under project No. FT161002.

BACKGROUND OF THE INVENTION

Technical Field

The present disclosure relates to sol-gel coating formulations. More specifically, the present disclosure relates to silica-based sol-gel coating formulations that contain metal oxide particles embedded in a hybrid polymer matrix derived from a tetraalkoxysilane, an aminoalkylsilane, a dialkoxysilane, and a silanol terminated polydimethylsiloxane.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Corrosion of metallic infrastructures is a major cause for metal-loss and challenge for many industries around the world. The application of protective coatings is still one of the most effective methods to mitigate corrosion of metallic infrastructures [P. A. Sørensen, S. Kiil, K. Dam-Johansen, C. E. Weinell, Anticorrosive coatings: a review, J. Coatings Technol. Res. 6 (2009) 135-176]. Coating formulation scientists are currently researching extensively in order to develop a competitive alternative to the currently available toxic chromate conversion coatings [R. Suleiman, M. Khaled, H. Wang, T. J. Smith, J. Gittens, R. Akid, B. Mohamad El Ali, A. Khalil, Comparison of selected inhibitor doped sol-gel coating systems for protection of mild steel, Corros. Eng. Sci. Technol. 49 (2014) 189-196; M. Oubaha, P. C. R. Varma, B. Duffy, Z. M. Gasem, S. J. Hinder, Development of a Novel Hybrid Aluminum-Based Sol-Gel Materials: Application to the Protection of AA2024-T3 Alloys in Alkaline Environment, Adv. Mater. Phys. Chem. 4 (2014) 75-84; and T. P. Chou, C. Chandrasekaran, G. Z. Cao, Sol-Gel-Derived Hybrid Coatings for Corrosion Protection, J. Sol-Gel Sci. Technol. 26 (2003) 321-327].

Sol-gel chemistry offers the possibility for the synthesis of different classes of hybrid organic-inorganic silica materials with promising applications as protective coatings for various metallic substrates [I. Santana, A. Pepe, W. Schreiner, S. Pellice, S. Ceré, Hybrid sol-gel coatings containing clay nanoparticles for corrosion protection of mild steel, Electrochim. Acta. 203 (2016) 396-403; H.-Y. Su, P.-L. Chen, C.-S. Lin, Sol-gel coatings doped with organosilane and cerium to improve the properties of hot-dip galvanized steel, Corros. Sci. 102 (2016) 63-71; and R. B. Figueira, C. J. R. Silva, E. V Pereira, Hybrid sol-gel coatings for corrosion protection of hot-dip galvanized steel in alkaline medium, Surf. Coatings Technol. 265 (2015) 191-204, each incorporated herein by reference in their entirety]. These hybrid silica materials, which are mainly produced through the hydrolysis and polycondensation reactions of organofunctional alkoxysilane precursors [M. W. Daniels, L. F. Francis, Silane Adsorption Behavior, Microstructure, and Properties of Glycidoxypropyltrimethoxysilane-Modified Colloidal Silica Coatings, J. Colloid Interface Sci. 205 (1998) 191-200; and R. Suleiman, H. Dafalla, B. El Ali, Novel hybrid epoxy silicone materials as efficient anticorrosive coatings for mild steel, RSC Adv. 5 (2015) 39155-39167, each incorporated herein by reference in their entirety], have combined properties of organic polymers (e.g., flexibility, ductility, dielectric) and inorganic silica (e.g., high thermal stability, strength, hardness, UV-vis absorbance). Desired hydrophobic, mechanical, barrier and adherence properties of a hybrid coating may be adjusted by controlling the chemistry of its organic and inorganic components [M. V. S. and M. I. Bruno A. Latella, Indentation and Fracture of Hybrid Sol-Gel Silica Films, in: Jiri Nemecek (Ed.), Nanoindentation Mater. Sci., 1st ed., InTech, 2012: pp. 133-160, incorporated herein by reference in its entirety].

The addition of metal oxides to hybrid coatings is a proposed approach to produce functionalized coatings with specific attributes [U. Lavrenčič Štangar, U. Opara, B. Orel, Structural and electrochemical properties of sol-gel derived $Mo:CeO_2$, $Si:Mo:CeO_2$ and $Si:CeO_2$ nanocrystalline films for electrochromic devices, J. Sol-Gel Sci. Technol. 8 (1997) 751-758, incorporated herein by reference in its entirety]. However, only limited research data are available for the influences of incorporating metal ions into the silicate network on the final properties of the functionalized hybrid material [K. Sinkó, Influence of Chemical Conditions on the Nanoporous Structure of Silicate Aerogels, Materials (Basel). 3 (2010) 704-740, incorporated herein by reference in its entirety].

In view of the forgoing, one objective of the present disclosure is to provide a sol-gel coating formulation containing metal oxide particles (e.g. aluminum oxide ($Al_2O_3$), calcium oxide (CaO), zinc oxide (ZnO), magnesium oxide (MgO), molybdenum oxide ($MoO_3$)) embedded in a hybrid silica polymer matrix derived from a tetraalkoxysilane, an aminoalkylsilane, a dialkoxysilane, a silanol terminated polydimethylsiloxane, and an aqueous solution containing an inorganic acid. A further objective of the present disclosure is to provide an anticorrosive coated metal substrate having a layer of the sol-gel coating formulation disposed on a surface of the metal substrate.

BRIEF SUMMARY OF THE INVENTION

According to a first aspect, the present disclosure relates to a sol-gel coating formulation containing (i) a hybrid polymer matrix, which is a reacted form of a resin composition including a tetraalkylorthosilicate, an aminoalkylsilane, a dialkoxysilane, a silanol terminated polydimethylsiloxane, and an aqueous solution containing an inorganic acid, and (ii) metal oxide particles embedded in the hybrid polymer matrix at a concentration of 0.01-0.5 g/ml, relative to a total volume of the hybrid polymer matrix.

In one embodiment, the resin composition includes a tetraalkylorthosilicate, a (3-aminopropyl)trialkoxysilane, a dialkoxy-alkyl-octadecylsilane, a silanol terminated polydimethylsiloxane, and an aqueous solution containing an inorganic acid.

In one embodiment, the tetraalkylorthosilicate is tetraethylorthosilicate.

In one embodiment, the aminoalkylsilane is (3-aminopropyl)trimethoxysilane.

In one embodiment, the dialkoxysilane is dimethoxymethyl-octadecylsilane.

In one embodiment, the silanol terminated polydimethylsiloxane has a number average molecular weight of 300-1,000 g/mol.

In one embodiment, the inorganic acid is nitric acid.

In one embodiment, the metal oxide particles are at least one selected from the group consisting of aluminum oxide, calcium oxide, zinc oxide, magnesium oxide, and molybdenum oxide.

In one embodiment, the resin composition includes tetraethylorthosilicate, (3-aminopropyl)trimethoxysilane, dimethoxy-methyl-octadecylsilane, a silanol terminated polydimethylsiloxane having a number average molecular weight of 300-1,000 g/mol, and an aqueous solution which includes nitric acid at a molar concentration of 0.01-0.5 M.

In one embodiment, the resin composition includes 10-30 vol % of tetraethylorthosilicate, 10-30 vol % of (3-aminopropyl)trimethoxysilane, 10-30 vol % of dimethoxy-methyl-octadecylsilane, 10-30 vol % of a silanol terminated polydimethylsiloxane having a number average molecular weight of 300-1,000 g/mol, and 1-5 vol % of an aqueous solution which includes nitric acid at a molar concentration of 0.01-0.5 M, each relative to a total volume of the resin composition.

In one embodiment, the sol-gel coating formulation contains (i) a hybrid polymer matrix, which is a reacted form of a resin composition including 15-25 vol % of tetraethylorthosilicate, 15-25 vol % of (3-aminopropyl)trimethoxysilane, 15-25 vol % of dimethoxy-methyl-octadecylsilane, 15-25 vol % of a silanol terminated polydimethylsiloxane having a number average molecular weight of 300-1,000 g/mol, and 1-5 vol % of an aqueous solution which includes nitric acid at a molar concentration of 0.01-0.5 M, each relative to a total volume of the resin composition, and (ii) metal oxide particles which are at least one selected from the group consisting of aluminum oxide, calcium oxide, zinc oxide, magnesium oxide, and molybdenum oxide embedded in the hybrid polymer matrix at a concentration of 0.02-0.1 g/mL relative to a total volume of the hybrid polymer matrix.

In one embodiment, the resin composition further comprises a non-aqueous solvent.

In one embodiment, the non-aqueous solvent is isopropyl alcohol.

According to a second aspect, the present disclosure relates to an anticorrosive coated metal substrate involving a metal substrate, and a layer of the sol-gel coating formulation of the first aspect, in cured form, disposed on the metal substrate, wherein the layer has a thickness of 10-200 μm.

In one embodiment, the anticorrosive coated metal substrate has a mean water contact angle of 92°-105°.

In one embodiment, the anticorrosive coated metal substrate has a root mean square height of surface roughness ($R_q$) of 0.05-8 μm, an arithmetic average height of surface roughness ($R_a$) of 0.01-6.0 μm, and a maximum height of peaks surface roughness ($R_p$) of 6-50 μm.

In one embodiment, the anticorrosive coated metal substrate has a Vickers hardness number of 12-30.

In one embodiment, the anticorrosive coated metal substrate has a critical load of 0.2-2.5 N.

In one embodiment, the anticorrosive coated metal substrate has an impedance value of $1\times10^4$-$1\times10^{10}\Omega$ after exposure to saline solution for 10-40 days.

According to a third aspect, the present disclosure relates to a method of preparing the sol-gel coating formulation of the first aspect. The method involves (i) mixing the tetraalkylorthosilicate, the aminoalkylsilicate, and the dialkoxysilane with an aqueous solution of the inorganic acid to form a first mixture, (ii) mixing the first mixture with the silanol terminated polydimethylsiloxane to form a second mixture, (iii) aging the second mixture at a temperature of 15-40° C. to form a hybrid polymer matrix, and (iv) mixing the hybrid polymer matrix with the metal oxide particles, thereby forming the sol-gel coating formulation.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
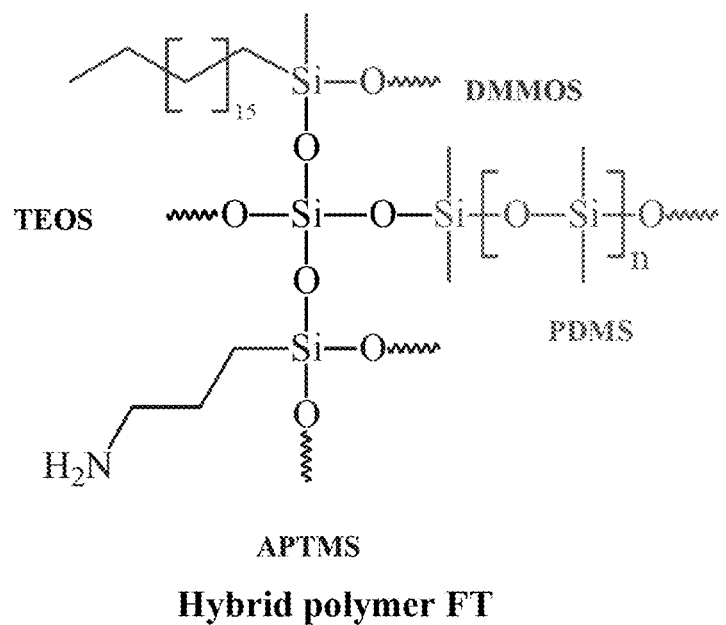
FIG. 1 is a proposed chemical structure of the hybrid polymer matrix (FT).
Figure 2A:
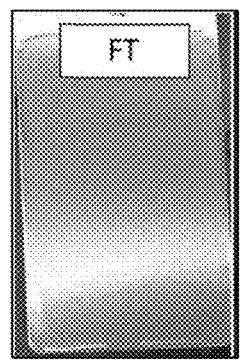
FIG. 2A shows a metal substrate coated with the hybrid polymer matrix (FT).
Figure 2B:
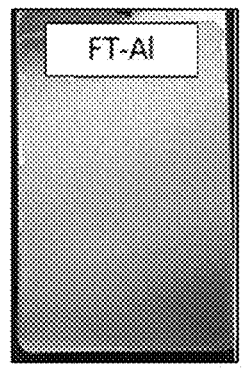
FIG. 2B shows a metal substrate coated with a sol-gel coating formulation containing aluminum oxide particles (FT-Al).
Figure 2C:
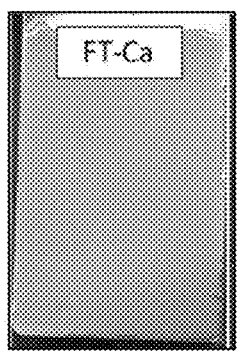
FIG. 2C shows a metal substrate coated with a sol-gel coating formulation containing calcium oxide particles (FT-Ca).
Figure 2D:
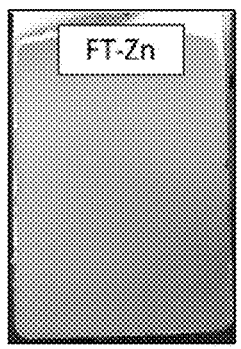
FIG. 2D shows a metal substrate coated with a sol-gel coating formulation containing zinc oxide particles (FT-Zn).
Figure 2E:
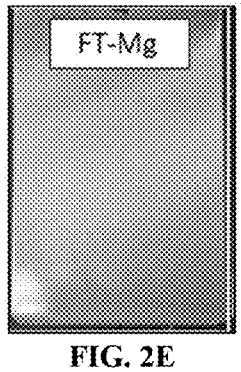
FIG. 2E shows a metal substrate coated with a sol-gel coating formulation containing magnesium oxide particles (FT-Mg).
Figure 2F:
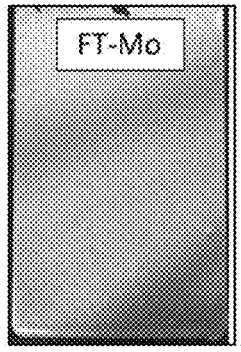
FIG. 2F shows a metal substrate coated with a sol-gel coating formulation containing molybdenum oxide particles (FT-Mo).

Embodiments of the present disclosure will now be described more fully hereinafter with reference to the accompanying drawings, in which some, but not all embodiments of the disclosure are shown.

The present disclosure may be better understood with reference to the following definitions. As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "substantially similar", "approximately", or "about" may be used when describing magnitude and/or position to indicate that the value and/or position described is within a reasonable expected range of values and/or positions. For example, a numeric value may have a value that is ±1% of the stated value (or range of values), ±2% of the stated value (or range of values), ±5% of the stated value (or range of values), ±10% of the stated value (or range of values), ±15% of the stated value (or range of values), or ±20% of the stated value (or range of values).

As used herein, the terms "compound" and "product" are used interchangeably, and are intended to refer to a chemical entity, whether in the solid, liquid or gaseous phase, and whether in a crude mixture or purified and isolated.

As used herein, the term "alkyl" unless otherwise specified refers to both branched and straight chain saturated aliphatic primary, secondary, and/or tertiary hydrocarbon fragments of typically $C_1$ to $C_{20}$. Non-limiting examples of such hydrocarbon fragments include methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl. As used herein, the term optionally includes substituted alkyl groups. Exemplary moieties with which the alkyl group can be substituted may be selected from the group including, but not limited to, hydroxy, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, and as known to those skilled in the art.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxy, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{15}N$, isotopes of oxygen include $^{17}O$ and $^{18}O$, and isotopes of silicon include $^{29}Si$ and $^{30}Si$. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

According to a first aspect, the present disclosure relates to a sol-gel coating formulation containing (i) a hybrid polymer matrix, which is a reacted (e.g., hydrolyzed) form of a resin composition including a tetraalkoxysilane, an aminoalkylsilane, a dialkoxysilane, a silanol terminated polydimethylsiloxane, and an aqueous solution containing an inorganic acid, and (ii) metal oxide particles embedded in the hybrid polymer matrix.

The tetraalkoxysilane included in the resin composition may be represented by formula (I):

where $R_1$, $R_2$, $R_3$, and $R_4$ are each independently an optionally substituted alkoxy, preferably an optionally substituted $C_1$-$C_6$ alkoxy, preferably an optionally substituted $C_2$-$C_5$ alkoxy, preferably an optionally substituted $C_3$-$C_4$ alkoxy. Exemplary tetraalkoxysilanes include, but are not limited to, tetramethyl orthosilicate, tetraethyl orthosilicate, tetrapropyl orthosilicate, tetraisopropyl orthosilicate, and tetrabutyl orthosilicate. In a preferred embodiment, the tetraalkoxysilane is tetraethylorthosilicate (TEOS). It is worth noting that post-modification of TEOS during the synthesis of the hybrid polymeric material with methyltrimethoxysilane, 3-glycidoxypropyltrimethoxysilane, 3-isocyanatopropyltriethoxysilane, and/or N-(2-aminoethyl)-3-aminopropyltrimethoxysilane may produce hybrid polymer matrixes either with unsatisfactory corrosion protection properties or low phase stability. Thus, in at least one embodiment, the resin composition disclosed herein is essentially free of methyltrimethoxysilane, (3-glycidoxypropyl)-trimethoxysilane, 3-isocyanatopropyltriethoxysilane, and N-(2-aminoethyl)-3-aminopropyltrimethoxysilane. For instance, the resin composition comprises less than 0.1 wt %, preferably less than 0.05 wt %, more preferably less than 0.01 wt % of methyltrimethoxysilane, (3-glycidoxypropyl)-trimethoxysilane, 3-isocyanatopropyltriethoxysilane, and N-(2-aminoethyl)-3-aminopropyltrimethoxysilane, relative to a total weight of the resin composition. In at least one embodiment, the resin composition described herein is devoid of methyltrimethoxysilane, 3-glycidoxypropyltrimethoxysilane, 3-isocyanatopropyltriethoxysilane, and N-(2-aminoethyl)-3-aminopropyltrimethoxysilane.

In certain embodiments, one or more alkoxy groups of $R_1$, $R_2$, $R_3$, and $R_4$ may be replaced by other hydrolyzable functionalities such as chloro and/or bromo groups. Alternatively, a trialkoxysilane represented by formula (II):

may be used in lieu of or in addition to the tetraalkoxysilane in the resin composition, where (i) $R_5$, $R_6$, and $R_7$ are each independently an optionally substituted alkoxy, preferably an optionally substituted $C_1$-$C_6$ alkoxy, preferably an optionally substituted $C_2$-$C_5$ alkoxy, preferably an optionally substituted $C_3$-$C_4$ alkoxy, and (ii) $R_8$ is an optionally substituted alkyl or optionally substituted cycloalkyl, preferably an optionally substituted $C_1$-$C_6$ alkyl, preferably an optionally substituted $C_2$-$C_5$ alkyl, preferably an optionally substituted $C_3$-$C_4$ alkyl. Exemplary trialkoxysilanes include, but are not limited to, ethyltrimethoxysilane, ethyltriethoxysilane, and (3-glycidoxypropyl)-triethoxysilane. In certain embodiments, one or more alkoxy groups of $R_5$, $R_6$, and $R_7$ may be replaced by other hydrolyzable functionalities such as chloro and/or bromo groups.

In one or more embodiments, the total amount of the tetraalkoxysilane and/or trialkoxysilanes contained in the resin composition ranges from 10-30 vol % relative to a total volume of the resin composition, preferably 12-28 vol %, preferably 15-25 vol %, preferably 18-23 vol %, or about 20 vol % relative to the total volume of the resin composite. In a preferred embodiment, the resin composition contains 10-30 vol % of tetraethylorthosilicate relative to the total volume of the resin composition, preferably 12-28 vol %, preferably 15-25 vol %, preferably 18-23 vol %, or about 20 vol % of tetraethylorthosilicate relative to the total volume of the resin composite.

The aminoalkylsilane included in the resin composition may be represented by formula (III)

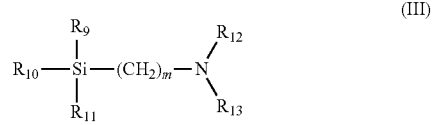

where (i) $R_9$ and $R_{10}$ are each independently an optionally substituted alkoxy, preferably an optionally substituted $C_1$-$C_6$ alkoxy, preferably an optionally substituted $C_2$-$C_5$ alkoxy, preferably an optionally substituted $C_3$-$C_4$ alkoxy, (ii) $R_{11}$ is an optionally substituted alkyl, optionally substituted cycloalkyl, or optionally substituted alkoxy, preferably an optionally substituted $C_1$-$C_6$ alkyl or optionally substituted $C_1$-$C_6$ alkoxy, preferably an optionally substituted $C_2$-$C_5$ alkyl or optionally substituted $C_2$-$C_5$ alkoxy, preferably an optionally substituted $C_3$-$C_4$ alkyl or optionally substituted $C_3$-$C_4$ alkoxy, (iii) $R_{12}$ and $R_{13}$ are each independently a hydrogen, optionally substituted alkyl, optionally substituted cycloalkyl, or optionally substituted aryl, preferably a hydrogen, and (iv) m is an integer ranging from 1-18, preferably 2-16, preferably 3-14, preferably 4-12, preferably 5-10, preferably 6-8. Non-limiting examples of aminoalkylsilane suitable for the currently disclosed sol-gel coating formulation include (3-aminopropyl)-trimethoxysilane, (3-aminopropyl)-triethoxysilane, (3-aminopropyl)-dimethoxy-methylsilane, (3-aminopropyl)-diethoxy-methylsilane, (3-aminopropyl)-dimethoxy-ethylsilane, (3-aminopropyl)-diethoxy-ethylsilane, trimethoxy[3-(methylamino)propyl]silane, [3-(N,N-dimethylamino)propyl]trimethoxysilane, and trimethoxy[3-(phenylamino)propyl]silane. In a preferred embodiment, the aminoalkylsilane is (3-aminopropyl)trimethoxysilane. In certain embodiments, one or more alkoxy groups of $R_9$, $R_{10}$, and $R_{11}$ (when an alkoxy present) may be replaced by other hydrolyzable functionalities such as chloro and/or bromo groups.

In one or more embodiments, the amount of the aminoalkylsilane in the resin composition ranges from 10-30 vol % relative to a total volume of the resin composition, preferably 12-28 vol %, preferably 15-25 vol %, preferably 18-22 vol %, or about 20 vol % relative to the total volume of the resin composition. In a preferred embodiment, the resin composition contains 10-30 vol % of (3-aminopropyl)trimethoxysilane relative to the total volume of the resin composition, preferably 12-28 vol %, preferably 15-25 vol %, preferably 18-22 vol %, or about 20 vol % of (3-aminopropyl)trimethoxysilane relative to the total volume of the resin composition.

The dialkoxysilane included in the resin composition may be represented by formula (IV)

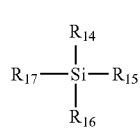

where (i) $R_{14}$ and $R_{15}$ are each independently an optionally substituted alkyl or optionally substituted cycloalkyl, preferably an optionally substituted $C_1$-$C_{22}$ alkyl, preferably an optionally substituted $C_2$-$C_{20}$ alkyl, preferably an optionally substituted $C_3$-$C_{18}$ alkyl, preferably an optionally substituted $C_3$-$C_{18}$ alkyl, preferably an optionally substituted $C_3$-$C_{18}$ alkyl, preferably an optionally substituted $C_4$-$C_{16}$ alkyl, preferably an optionally substituted $C_5$-$C_{14}$ alkyl, preferably an optionally substituted $C_6$-$C_{12}$ alkyl, preferably an optionally substituted $C_7$-$C_{10}$ alkyl, and (ii) $R_{16}$ and $R_{17}$ are each independently an optionally substituted alkoxy, preferably an optionally substituted $C_1$-$C_6$ alkoxy, preferably an optionally substituted $C_2$-$C_5$ alkoxy, preferably an optionally substituted $C_3$-$C_4$ alkoxy. Exemplary dialkoxysilanes include, but are not limited to, dimethoxy-methyl-octadecylsilane, dimethoxy-methyl-octylsilane, dimethoxy-methyl(3,3,3-trifluoropropyl)silane, chloromethyl(methyl)dimethoxysilane, chloromethyl(methyl)diethoxysilane, 3-mercaptopropyl(dimethoxy)methylsilane, diisobutyldimethoxysilane, dicyclopentyl(dimethoxy)silane, dimethoxymethylvinylsilane, 3-glycidyloxypropyldiethoxymethylsilane, and 3-glycidyloxypropyldimethoxymethylsilane. In a preferred embodiment, the dialkoxysilane is dimethoxy-methyl-octadecylsilane.

In one or more embodiments, the amount of the dialkoxysilane contained in the resin composition ranges from 10-30 vol % relative to a total volume of the resin composition, preferably 12-28 vol %, preferably 15-25 vol %, preferably 18-22 vol %, or about 20 vol % relative to the total volume of the resin composition. In a preferred embodiment, the resin composition contains 10-30 vol % of dimethoxy-methyl-octadecylsilane relative to a total volume of the resin composition, preferably 12-28 vol %, preferably 15-25 vol %, preferably 18-22 vol %, or about 20 vol % of dimethoxy-methyl-octadecylsilane relative to the total volume of the resin composition.

The silanol terminated polydimethylsiloxane included in the resin composition may be represented by formula (V)

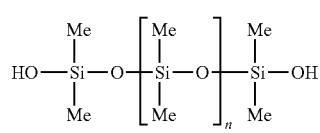

wherein n is the "degree of polymerization" which refers to the number of repeating units in the polydimethylsiloxane. In one embodiment, the degree of polymerization n is in the range of 2-100, 3-50, 4-40, 5-30, 6-20, or 7-15. In one or more embodiments, the silanol terminated polydimethylsiloxane included in the resin composition has a number average molecular weight of 300-1,500 g/mol, preferably 400-1,000 g/mol, preferably 500-800 g/mol, preferably 600-700 g/mol. However, in certain embodiments, the silanol terminated polydimethylsiloxane may have a number average molecular weight less than 300 g/mol, or greater than 1,500 g/mol. The viscosity of the silanol terminated polydimethylsiloxane may be dependent on its molecular weight. In one embodiment, the silanol terminated polydimethylsiloxane used herein has a viscosity of 8-80 centistokes (cSt), preferably 10-70 cSt, preferably 12-60 cSt, preferably 14-50 cSt, preferably 16-40 cSt, preferably 18-30 cSt, preferably 20-25 cSt. However, in certain embodiment, the silanol terminated polydimethylsiloxane may have a viscosity less than 8 cSt, or greater than 80 cSt. For example, a silanol terminated polydimethylsiloxane with a number average molecular weight of 4000-4500 g/mol having a larger viscosity of 90-120 cSt may be used in lieu of, or in addition to the aforementioned silanol terminated polydimethylsiloxane having a number average molecular weight of up to 1,500 g/mol. Other suitable polydimethylsiloxanes that may be used in the resin composition include, but are not limited to, aminopropyl terminated polydimethylsiloxane, aminopropyl terminated polydiethylsiloxane, and dimethylamino terminated polydimethylsiloxane. In one or more embodiments, the amount of the silanol terminated polydimethylsiloxane contained in the resin composition ranges from 10-30 vol % relative to a total volume of the resin composition, preferably 12-28 vol %, preferably 15-25 vol %, preferably 18-22 vol %, or about 20 vol % relative to the total volume of the resin composition.

As used herein, monomers are molecules which can undergo polymerization, thereby contributing constitutional repeating units to the structures of a macromolecule or polymer matrix. The process by which monomers combine end to end to form a polymer matrix is referred to herein as "polymerization". As used herein, "crosslinking", "cross-linking", "crosslinked", "cross-linked", a "crosslink", or a "cross-link" refers to polymer matrixes containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc. with the presence of at least one crosslinking monomer having more than two extension points, which is a monomer having more than two reactive sites. In certain embodiments, the tetraalkoxysilane of formula (I) having four reactive sites (e.g. four alkoxide groups) functions as a crosslinking monomer, where each hydrolysable position can act as an extension point and form a crosslink. In certain embodiments, the aminoalkylsilane of formula (III) having up to three reactive sites (e.g. alkoxide groups) functions as a crosslinking monomer, where each hydrolysable position can act as an extension point and form a crosslink. An extent of crosslinking refers to the proportion of reacted crosslinking monomers in a crosslink backbone, which can be determined by extraction, nuclear magnetic resonance (NMR) spectroscopy, and swelling experiments.

The inorganic acid in the resin composition may serve as a hydrolysis catalyst or crosslinking catalyst. Exemplary inorganic acids that may be suitable for the resin composition include, without limitation, nitric acid, hydrochloric acid, sulfuric acid, phosphoric acid, boric acid, hexafluorophosphoric acid. In a preferred embodiment, the inorganic acid is nitric acid. It is equally envisaged that the currently disclosed resin composition may be adapted to include an organic acid (e.g. acetic acid, formic acid, fluoroacetic acid, citric acid, benzoic acid) in addition to or in lieu of the inorganic acid.

The inorganic acid may be included in the resin composition as an aqueous solution containing the inorganic acid at a molar concentration of 0.01-0.5 M, 0.05-0.4 M, 0.1-0.3 M, or 0.15-0.25 M. In one or more embodiments, the resin composition contains 1-5 vol % of the aqueous solution of the inorganic acid at a concentration within the aforementioned ranges relative to a total volume of the resin composition, preferably 1.5-4.5 vol %, preferably 2-4 vol %, preferably 2.5-3.5 vol % of the aqueous solution of the inorganic acid at a concentration within the aforementioned ranges relative to a total volume of the resin composition. In at least one embodiment, the resin composition contains 1-5 vol % of the aqueous solution of nitric acid at a concentration of 0.01-0.2 M, 0.02-0.15 M, 0.04-0.1 M, or about 0.05 M relative to the total volume of the resin composition, preferably 1.5-4.5 vol %, preferably 2-4 vol %, preferably 2.5-3.5 vol % of the aqueous solution of nitric acid at a concentration of 0.01-0.2 M, 0.02-0.15 M, 0.04-0.1 M, or about 0.05 M.

In one or more embodiments, the resin composition includes 10-30 vol %, preferably 15-25 vol %, more preferably 18-22 vol %, or about 20 vol % of the tetraalkylorthosilicate described herein in any of its embodiments, 10-30 vol %, preferably 15-25 vol %, more preferably 18-22 vol %, or about 20 vol % of the aminoalkylsilane described herein in any of its embodiments, 10-30 vol %, preferably 15-25 vol %, more preferably 18-22 vol %, or about 20 vol % of the dialkoxysilane described herein in any of its embodiments, 10-30 vol %, preferably 15-25 vol %, more preferably 18-22 vol %, or about 20 vol % of the silanol terminated polydimethylsiloxane described herein in any of its embodiments, and 1-5 vol %, 2-4 vol %, or about 2.5 vol % of the aqueous solution containing an inorganic acid described herein in any of its embodiments, each relative to a total volume of the resin composition.

In a preferred embodiment, the resin composition includes tetraethylorthosilicate, (3-aminopropyl)trimethoxysilane, dimethoxy-methyl-octadecylsilane, a silanol terminated polydimethylsiloxane having a number average molecular weight of 300-1,500 g/mol, 400-1,200 g/mol, 500-900 g/mol, or 600-700 g/mol, and an aqueous solution which includes nitric acid at a molar concentration of 0.01-0.5 M, 0.02-0.4 M, 0.03-0.2 M, 0.04-0.1 M, or about 0.05 M.

In a more preferred embodiment, the resin composition includes 10-30 vol %, preferably 15-25 vol %, more preferably 18-22 vol %, or about 20 vol % of tetraethylorthosilicate, 10-30 vol %, preferably 15-25 vol %, more preferably 18-22 vol %, or about 20 vol % of (3-aminopropyl)trimethoxysilane, 10-30 vol %, preferably 15-25 vol %, more preferably 18-22 vol %, or about 20 vol % of dimethoxy-methyl-octadecylsilane, 10-30 vol %, preferably 15-25 vol %, more preferably 18-22 vol %, or about 20 vol % of a silanol terminated polydimethylsiloxane having a number average molecular weight of 300-1,000 g/mol, 400-1,200 g/mol, 500-900 g/mol, or 600-700 g/mol, and 1-5 vol %, 2-4 vol %, or about 2.5 vol % of an aqueous solution which includes nitric acid at a molar concentration of 0.01-0.5 M, 0.02-0.4 M, 0.03-0.2 M, 0.04-0.1 M, or about 0.05 M, each relative to a total volume of the resin composition.

In one or more embodiments, the resin composition disclosed herein further comprises a non-aqueous solvent or diluent. Exemplary solvents or diluents include, but are not limited to, methanol, ethanol, n-propanol, isopropyl alcohol, n-butanol, and isobutanol. Preferably, the non-aqueous solvent is isopropyl alcohol. The amount of the non-aqueous solvent present in the resin composition may range 5-30 vol %, 10-28 vol %, 12-25 vol %, 14-22 vol %, 16-18 vol %, or about 17.5 vol % relative to a total volume of the resin composition.

In one embodiment, the hybrid polymer matrix, which is a reacted form of the resin composition including tetraalkylorthosilicate, (3-aminopropyl)trialkoxysilane, a dialkoxyalkyl-octadecylsilane, the silanol terminated polydimethylsiloxane, and a catalytic aqueous solution including the inorganic acid, may be represented by formula (VI)

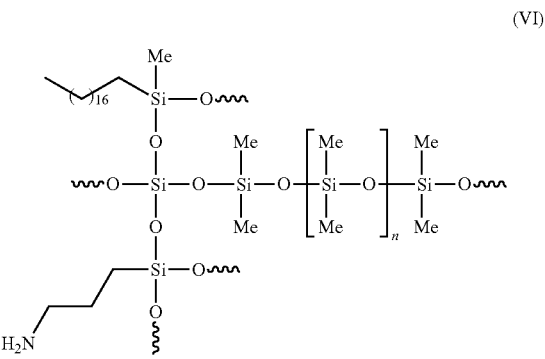

wherein n is in the range of 2-100, 3-50, 4-40, 5-30, 6-20, or 7-15.

In one or more embodiments, the sol-gel coating formulation of the current disclosure comprises metal oxide particles within the aforementioned hybrid polymer matrix in any of its embodiments. The metal oxide particles may be embedded in the hybrid polymer matrix. The hybrid polymer matrix may encapsulate the metal oxide particles. The hybrid polymer matrix may fill the interspaces between metal oxide particles. The hybrid polymer matrix may interact with the surface of the metal oxide particles via van der Waals forces and/or electrostatic interactions.

Exemplary metal oxide particles include, but are not limited to, aluminum oxide, calcium oxide, zinc oxide, magnesium oxide, molybdenum oxide, tungsten trioxide, cerium oxide, zirconium oxide, titanium oxide, antimony oxide, stannic oxide, and indium oxide, and alloys or mixtures thereof. In a preferred embodiment, the metal oxide particles are at least one selected from the group consisting of aluminum oxide, calcium oxide, zinc oxide, magnesium oxide, and molybdenum oxide. In a more preferred embodiment, the metal oxide particles embedded in the hybrid polymer matrix are calcium oxide. In an even more preferred embodiment, the metal oxide particles embedded in the hybrid polymer matrix are molybdemun oxide. The metal oxide particles may be embedded in the hybrid polymer matrix at a concentration of 0.005-1 g/mL, 0.01-0.5 g/mL, 0.02-0.4 g/mL, 0.03-0.3 g/mL, 0.04-0.2 g/mL, 0.045-0.1 g/mL, or about 0.05 g/mL relative to a total volume of the hybrid polymer matrix.

A particle is defined as a small object that behaves as a whole unit with respect to its transport and properties. The metal oxide of the present disclosure in any of its embodiments may be in the form of particles of the same shape or different shapes, and of the same size or different sizes. An average particle size (e.g., average particle diameter) of the particle, as used herein, refers to the average linear distance measured from one point on the particle through the center of the particle to a point directly across from it. Microparticles are particles having an average diameter between 0.1 and 100 μm in size. Nanoparticles are particles having an average diameter between 1 and 100 nm in size. In one embodiment, the metal oxide particles used herein may be in the form of microparticles having an average diameter in a range of 0.1-100 μm, 0.5-90 μm, 1-80 μm, 2-70 μm, 3-60 μm, 4-50 μm, 5-40 μm, 6-30 μm, 7-20 μm, or 8-10 μm. In another embodiment, the metal oxide particles may be in the form of nanoparticles having an average diameter in a range of 1-99 nm, 5-90 nm, 10-80 nm, 20-70 nm, 30-60 nm, or 40-50 nm.

The particles (e.g. nanoparticles, microparticles) of the metal oxide used herein may be spherical, ellipsoidal, oblong, ovoidal, or some other rounded shape. In an alternative embodiment, the particles may be angular, rectangular, prismoidal, or some other angular shape. The metal oxide particles may be agglomerated or non-agglomerated (i.e., the metal oxide particles are well separated from one another and do not form clusters). In one embodiment, the metal oxide particles are agglomerated. The size and shape of particles may be analyzed by techniques such as dynamic light scattering (DLS), scanning electron microscopy (SEM), transmission electron microscopy (TEM), and/or atomic force microscopy (AFM).

In one embodiment, the sol-gel coating formulation disclosed herein contains (i) a hybrid polymer matrix, which is a reacted form of a resin composition including 10-30 vol %, preferably 15-25 vol %, more preferably 18-22 vol %, or about 20 vol % of the tetraalkylorthosilicate described herein in any of its embodiments, 10-30 vol %, preferably 15-25 vol %, more preferably 18-22 vol %, or about 20 vol % of the aminoalkylsilane described herein in any of its embodiments, 10-30 vol %, preferably 15-25 vol %, more preferably 18-22 vol %, or about 20 vol % of the dialkoxysilane described herein in any of its embodiments, 10-30 vol %, preferably 15-25 vol %, more preferably 18-22 vol %, or about 20 vol % of the silanol terminated polydimethylsiloxane described herein in any of its embodiments, and 1-5 vol %, 2-4 vol %, or about 2.5 vol % of the aqueous solution containing an inorganc acid described herein in any of its embodiments, each relative to a total volume of the resin composition, and (ii) the metal oxide particles described herein in any of its embodiments embedded in the hybrid polymer matrix at a concentration of 0.005-1 g/mL, 0.01-0.5 g/mL, 0.02-0.4 g/mL, 0.03-0.3 g/mL, 0.04-0.2 g/mL, 0.045-0.1 g/mL, or about 0.05 g/mL relative to a total volume of the hybrid polymer matrix.

In a preferred embodiment, the sol-gel coating formulation disclosed herein contains (i) a hybrid polymer matrix, which is a reacted form of a resin composition including 10-30 vol %, preferably 15-25 vol %, more preferably 18-22 vol %, or about 20 vol % of tetraethylorthosilicate, 10-30 vol %, preferably 15-25 vol %, more preferably 18-22 vol %, or about 20 vol % of (3-aminopropyl)trimethoxysilane, 10-30 vol %, preferably 15-25 vol %, more preferably 18-22 vol %, or about 20 vol % of dimethoxy-methyl-octadecylsilane, 10-30 vol %, preferably 15-25 vol %, more preferably 18-22 vol %, or about 20 vol % of a silanol terminated polydimethylsiloxane having a number average molecular weight of 300-1,000 g/mol, 400-1,200 g/mol, 500-900 g/mol, or 600-700 g/mol, and 1-5 vol %, 2-4 vol %, or about 2.5 vol % of an aqueous solution which includes nitric acid at a molar concentration of 0.01-0.5 M, 0.02-0.4 M, 0.03-0.2 M, 0.04-0.1 M, or about 0.05 M, each relative to a total volume of the resin composition, and (ii) metal oxide particles which are at least one selected from the group consisting of aluminum oxide, calcium oxide, zinc oxide, magnesium oxide, and molybdenum oxide embedded in the hybrid polymer matrix at a concentration of 0.005-1 g/mL, 0.01-0.5 g/mL, 0.02-0.4 g/mL, 0.03-0.3 g/mL, 0.04-0.2 g/mL, 0.045-0.1 g/mL, or about 0.05 g/mL relative to a total volume of the hybrid polymer matrix.

According to another aspect, the present disclosure relates to a method of preparing the sol-gel coating formulation of the first aspect. The method involves (i) mixing the tetraalkylorthosilicate, the aminoalkylsilane, and the dialkoxysilane with the aqueous solution of an inorganic acid to form a first mixture, (ii) mixing the first mixture with the silanol terminated polydimethylsiloxane to form a second mixture, (iii) aging the second mixture at a temperature of 15-40° C. to form a hybrid polymer matrix, and (iv) mixing the hybrid polymer matrix with the metal oxide particles, thereby forming the sol-gel coating formulation.

The silanes (the tetraalkylorthosilicate, the aminoalkylsilane, and the dialkoxysilane) are mixed with the aqueous solution of an inorganic acid (e.g. nitric acid) and the optional non-aqueous solvent (e.g. isopropyl alcohol) each at the aforementioned amounts to form a first mixture. The silanol terminated polydimethylsiloxane may be mixed with the first mixture to form the second mixture. The mixtures may be agitated by an agitator, a vortexer, a rotary shaker, a magnetic stirrer, a centrifugal mixer, an overhead stirrer, or a sonicator. In another embodiment, the mixture is left to stand (i.e. not agitated). Preferably, the mixture is agitated using a magnetic stirrer at a speed of 200-1,000 rpm, 400-800 rpm, or 500-700 rpm at a temperature of 4-40° C., 10-30° C., or 15-25 ° C. for 2-48 hours, 4-36 hours, 6-24 hours, or 8-12 hours. In an alternative embodiment, the order of mixing of the components can be varied. In one particular alternative embodiment, the silanes and the silanol terminated polydimethylsiloxane are mixed simultaneously.

For the purpose of the present disclosure, a "sol-gel material" is a material prepared via a "sol-gel" process where an oxide network formed through hydrolysis and polycondensation reactions of molecular precursors in a liquid form (sol). In the present case, the molecular precursors are the silanes (tetraalkylorthosilicate, the aminoalkylsilane, the dialkoxysilane, and silanol terminated polydimethylsiloxane). As used herein, the sol-gel process is considered as "an aging process", and the "sol-gel material" obtained may be referred as a "gel" or "hybrid polymer matrix". Subsequently, the gel or hybrid polymer matrix may be mixed with the aforementioned metal oxide particles and applied as a coating to a substrate. The coating may be dried (e.g. air dried) to remove liquids, favor further polycondensation, and thus yield a cured, hard film. The sol-gel coating formulation in cured form may have a greater extent of crosslinking than that of the sol-gel coating formulation before curing.

The second mixture may be aged at a temperature of 8-50° C., 12-40° C., 15-35° C., 18-30° C., or 20-25° C. for 6-48 hours, 12-36 hours, 18-30 hours, or 20-24 hours to form the hybrid polymer matrix. In some embodiments, an additional aqueous solution of an inorganic acid (e.g. nitric acid) is added to the second mixture during the aging process to further facilitate the polymerization reaction.

The metal oxide particles may be mixed with the hybrid polymer matrix via agitation by an agitator, a vortexer, a rotary shaker, a magnetic stirrer, a centrifugal mixer, an overhead stirrer, or a sonicator, thereby forming the sol-gel coating formulation. Preferably, the metal oxide particles are mixed with the hybrid polymer matrix via sonication carried out in an ultrasonic bath, with an ultrasonic probe, or using an ultrasonic processor, for a period of 0.1-4 hours, 0.5-3 hours, or 1-2 hours.

According to a further aspect, the present disclosure relates to an anticorrosive coated metal substrate involving a metal substrate, and a layer of the sol-gel coating formulation of the first aspect, in cured form, disposed on the metal substrate, wherein the layer has a thickness of 10-200 μm, 20-150 μm, 30-120 μm, 40-100 μm, 50-80 μm, or 60-70 μm. However, in certain embodiments, the layer has a thickness less than 10 μm, or greater than 200 μm. In one embodiment, 70-100%, more preferably 80-99%, more preferably 85-97% of the surface of the metal substrate is covered with the layer of the sol-gel coating formulation of the first aspect, in cured form, though in some embodiments, less than 70% of the surface of the metal substrate is covered with the layer comprising the sol-gel coating formulation in cured formed.

Examples of metal substrates that may be coated according to the current disclosure include, but are not limited to, carbon steel such as mild steel or low-carbon steel, medium-carbon steel, high-carbon steel, and ultra-high-carbon steel, alloy steel, stainless steel, austenitic steel, ferritic steel, martensitic steel, tool steel or mixtures thereof. Preferably, the metal substrate is a carbon steel with a carbon content of 0.05-0.5%, 0.1-0.25%, or 0.15-0.2%.

In one embodiment, the layer of the sol-gel coating formulation disposed on the metal substrate is air-dried to reach a cured form. As used herein, "air-dry", "air-drying", or "air-dried" means that the presently disclosed sol-gel coating formulation, following application to a metal substrate, cures in the presence of air. The air may have a relative humidity of 10-99%, preferably 15-95%, more preferably 20-90%, even more preferably 25-80% and a temperature of −10-120° C., preferably 5-80° C., more preferably 10-60° C., even, more preferably 20-40° C. In one embodiment, the sol-gel coating foirnulation disposed on the metal substrate cures within 6 hours-7 days, 12 hours-4 days, 18-48 hours, or about 24 hours via air-drying process.

The water contact angle measurement (CAM) is a very informative tool for evaluating the hydrophilicity/hydrophobicity of coated films. The water contact angle may contribute to the barrier properties of coatings on metal surfaces. Generally, if the water contact angle is smaller than 90°, the coating surface is considered hydrophilic, and if the water contact angle is larger than 90°, the coating surface is considered hydrophobic. It is desirable for coatings on metal substrates to be highly hydrophobic with limited water wettability [X. Zhang, F. Zheng, L. Ye, P. Xiong, L. Yan, W. Yang, B. Jiang, A one-pot sol-gel process to prepare a superhydrophobic and environment-resistant thin film from ORMOSIL nanoparticles, RSC Adv. 4 (2014) 9838-9841, incorporated herein by reference in its entirety]. The wettability of an anticorrosive protective coating is an indication of a loss in hydrophobicity of the coating which would eventually lead to the onset of corrosion. Hence, the lack of wettability is an indication of desirable anticorrosive property of the coating. In one or more embodiments, the anticorrosive coated metal substrate has a mean water contact angle of 92°-110°, 93°-108°, 94°-106°, 95°-105°, 96°-104°, 97°-103°, 98°-102°, or 99°-101°. In one embodiment, Surface roughness is a component of surface texture. It is quantified by the deviations in the direction of the normal vector of a real surface from its ideal form. If these deviations are large, the surface is rough; if they are small, the surface is smooth. In one embodiment, the anticorrosive coated metal substrate has an arithmetic average height of surface roughness ($R_a$) of 0.01-6.0 μm, 0.1-5.0 μm, 0.5-4.0 μm, or 1.0-3.0 μm. The arithmetic average height of surface roughness ($R_a$) of the anticorrosive coated metal substrate coated with the sol-gel coating formulation disclosed herein in any of its embodiments may be 0.05-0.8%, 0.1-0.6%, or 0.2-0.3% relative to that of a metal substrate coated with a substantially identical sol-gel coating formulation devoid of any metal oxide particles. The arithmetic average height of surface roughness ($R_a$) of the anticorrosive coated metal substrate coated with the sol-gel coating formulation containing molybdenum oxide particles may be 0.1-1%, 0.2-0.5%, or 0.25-0.3% relative to that of the anticorrosive coated metal substrate coated with a substantially identical sol-gel coating formulation containing calcium oxide particles.

In one embodiment, the anticorrosive coated metal substrate has a root mean square height of surface roughness ($R_q$) of 0.05-8 μm, 0.1-7 μm, 0.5-6 μm, 1-5 μm, or 2-4 μm. The root mean square height of surface roughness ($R_q$) of the anticorrosive coated metal substrate coated with the sol-gel coating formulation disclosed herein in any of its embodiments may be 0.3-1.5%, 0.5-1.2%, or 0.7-0.9% relative to that of a metal substrate coated with a substantially identical sol-gel coating formulation devoid of any metal oxide particles. The root mean square height of surface roughness ($R_q$) of anticorrosive coated metal substrate coated with a sol-gel coating formulation containing molybdenum oxide particles may be 0.5-2%, 0.7-1.5%, or 0.8-1% relative to that of the anticorrosive coated metal substrate coated with a substantially identical sol-gel coating formulation containing calcium oxide particles.

In one embodiment, the anticorrosive coated metal substrate has a maximum height of peaks ($R_p$) surface roughness of 6-50 μm, 10-45 μm, 15-40 μm, 20-35 μm, or 25-30 μm. The maximum height of peaks ($R_p$) surface roughness of the anticorrosive coated metal substrate coated with the sol-gel coating formulation disclosed herein in any of its embodiments may be 4-20%, 8-18%, or 12-16% relative to that of a metal substrate coated with a substantially identical sol-gel coating formulation devoid of any metal oxide particles. The maximum height of peaks ($R_p$) surface roughness of anticorrosive coated metal substrate coated with a sol-gel coating formulation containing molybdenum oxide particles may be 6-25%, 10-20%, or 15-18% relative to that of the anticorrosive coated metal substrate coated with a substantially identical sol-gel coating formulation containing calcium oxide particles.

Vickers hardness measurements are very beneficial for evaluating the mechanical properties and durability of coatings [A. Iost, D. Najjar, R. Hellouin, Modelling of the Vickers hardness of paint coatings deposited on metallic substrates, Surf. Coatings Technol. 165 (2003) 126-132, incorporated herein by reference in its entirety]. The inorganic silica network and the loaded metal oxides may provide a proper hardness to sol-gel coating films [M. V. S. and M. I. Bruno A. Latella, Indentation and Fracture of Hybrid Sol-Gel Silica Films, in: Jiri Nemecek (Ed.), Nanoindentation Mater. Sci., 1st ed., InTech, 2012: pp.

133-160, incorporated herein by reference in its entirety]. In one embodiment, the anticorrosive coated metal substrate has a Vickers hardness number (VHN) of 12-35, preferably 15-30, preferably 18-28, preferably 20-25. The anticorrosive coated metal substrate coated with the sol-gel coating formulation disclosed herein in any of its embodiments may have a Vickers hardness number that is 15-80% greater, preferably 20-60% greater, more preferably 30-50% greater than that of a metal substrate coated with a substantially identical sol-gel coating formulation devoid of any metal oxide particles. The anticorrosive coated metal substrate coated with a sol-gel coating formulation containing molybdenum oxide particles may have a Vickers hardness number that is 30-75% greater, 40-65% greater, or 45-55% greater than that of the anticorrosive coated metal substrate coated with a substantially identical sol-gel coating formulation containing zinc oxide particles.

The critical load ($L_c$) of a coating, which is a maximum load the coating can bear before failure (e.g. scratches, peelings, chippings, etc) occurs, gives valuable information on the coating cracking, adhesion strength to metal, as well as the existence of any delamination phenomenon [Z. Peng, H. Miao, L. Qi., S. Yang, C. Liu, Hard and wear-resistant titanium nitride coatings for cemented carbide cutting tools by pulsed high energy density plasma, Acta Mater. 51 (2003) 3085-3094, incorporated herein by reference in its entirety]. In one embodiment, the anticorrosive coated metal substrate has a critical load of 0.2-3.0 N, preferably 0.4-2.5 N, preferably 0.6-2.0 N, preferably 0.8-1.5 N, preferably 1.0-1.2 N. The anticorrosive coated metal substrate coated with the sol-gel coating formulation disclosed herein in any of its embodiments may have a critical load that is 5-95% greater, preferably 20-90% greater, more preferably 40-85% greater, even more preferably 60-80% greater than that of a metal substrate coated with a substantially identical sol-gel coating formulation devoid of any metal oxide particles. The anticorrosive coated metal substrate coated with a sol-gel coating formulation containing molybdenum oxide particles may have a critical load that is 60-95% greater, 75-92% greater, or 85-90% greater than that of the anticorrosive coated metal substrate coated with a substantially identical sol-gel coating formulation containing magnesium oxide particles.

In some embodiments, the anticorrosive coated metal substrate is subjected to various characterization techniques after a prolonged period (e.g. 10-40 days) of being immersed in a saline solution containing at least 1.0 wt % of salts (e.g. NaCl, KCl, $MgCl_2$, etc.), preferably 1.2-10 wt %, more preferably 3-5 wt %, or about 3.5 wt % of salts.

Electrical impedance is the measure of opposition that a circuit presents to a current when voltage is applied. Electrical impedance spectroscopy (EIS) has been applied to the study of corrosion systems and been proven to be a powerful and accurate method for measuring corrosion rates via the electrical properties of a medium as a function of frequency. It is based on the interaction of an external field with the electric dipole moment of the sample. The resistance of the anticorrosive coated metal substrate described herein, is a measurement of impedance by applying Ohm's law to a reduction in current of an applied voltage, detected in the presence of the sol-gel coating formulation described herein. In one or more embodiments, the sol-gel coating formulation of the present disclosure in any of its embodiments imparts an impedance value of $1\times10^4$-$1\times10^{10}\Omega$ to the metal substrate, preferably $1\times10^5$-$1\times10^9\Omega$, a preferably $1\times10^6$-$1\times10^8\Omega$, more preferably $1\times10^7$-$5\times10^7$ $\Omega$ after exposure to saline solution for 10-40 days, 14-35 days, 20-32 days, or 30 days. The anticorrosive coated metal substrate coated with a sol-gel coating formulation containing aluminum oxide, calcium oxide, or zinc oxide particles may have an impedance value that is 2-20 times greater, 5-15 times greater, or 8-10 times greater than that of a metal substrate coated with a substantially identical sol-gel coating formulation devoid of any metal oxide particles. The anticorrosive coated metal substrate coated with a sol-gel coating formulation containing aluminum oxide, calcium oxide, or zinc oxide particles may have an impedance value that is $10^2$-$10^6$ times greater, $10^3$-$10^5$ times greater, or $10^4$-$5\times10^4$ times greater than that of the anticorrosive coated metal substrate coated with a sol-gel coating formulation containing molybdenum oxide or magnesium oxide particles.

In certain embodiments, the sol-gel coating formulation disclosed herein in any of its embodiments may further include one or more dye compounds or color pigments. In certain embodiments, other substrates such as aluminum, copper, magnesium, and alloys thereof, glass, plastics (e.g. PVC, polycarbonate, polyurethane, polymethacrylate, polystyrene), wood, ceramics or concrete may be advantageously coated with the cured sol-gel coating formulation described herein.

The examples below are intended to further illustrate protocols for preparing and characterizing sol-gel coating formulations, as well as anticorrosive coated metal substrates, and are not intended to limit the scope of the claims.

EXAMPLE 1

Synthesis and Functionalization of the Hybrid Coating: Chemicals

The chemicals: tetraethylorthosilicate (TEOS), (3-aminopropyl)trimethoxysilane (APTMS), dimethoxy-methyl-octadecylsilane (DMMOS), aluminum oxide ($Al_2O_3$), calcium oxide (CaO), magnesium oxide (MgO), and isopropyl alcohol (IPA) were purchased from Sigma-Aldrich (USA), Molybdenum(VI) oxide ($MoO_3$) was obtained from Fluka (Switzerland), while zinc oxide (ZnO) was purchased from BDH Chemicals (England). Polydimethylsiloxane, silanol terminated (PDMS), molecular weight 400-700, was obtained from Gelest Company (USA). All of the above chemicals were used as received and the chemical structures of the used silane chemicals are available Table 1. Sodium chloride (NaCl) and nitric acid ($HNO_3$) were obtained from Loba Chemie (India) and their aqueous solutions were prepared using distilled water.

TABLE 1

Chemical structure of the synthetic precursors of the hybrid coating FT

| Name | Structure |
|---|---|
| Tetraethylorthosilicate (TEOS) | 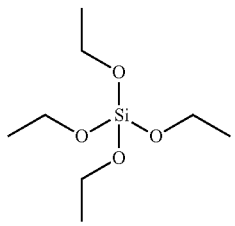 |
| (3-Aminopropyl) trimethoxysilane (APTMS) | 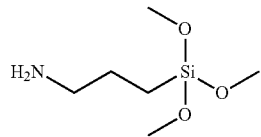 |

TABLE 1-continued

Chemical structure of the synthetic precursors of the hybrid coating FT

| Name | Structure |
|---|---|
| Dimethoxy-methyl-octadecylsilane (DMMOS) | |
| Polydimethylsiloxane, Silanol Terminated (PDMS) | |
| Isopropyl alcohol (IPA) | |

EXAMPLE 2

Synthesis of the Parent Hybrid Polymer and Its Functionalization With Metal Oxides The hybrid organic-inorganic sol-gel parent polymeric material (hereafter denoted as FT) was prepared by mixing 5 mL of TEOS (4.67 g, 0.0224), 5 mL of APTMS (5.135 g, 0.0286 mol), 5 mL of DMMOS (4.3 g, 0.0119 mol), and 3 mL IPA in a 50-mL beaker at room temperature and open to air for 1 h. The sol-gel reaction of the available silanol groups in all precursors was initiated via dropwise addition of 1 mL of a 2:1 mixture of isopropyl alcohol (IPA)-0.05 N $HNO_3$ to the reaction mixture. PDMS solution was then added to the reaction mixture, and the resultant colorless solution was stirred at 700 rpm for 24 h. Finally, another 1 mL of the acid-IPA catalyst was added dropwise to the solution and the resulting hybrid sol-gel mixture was stirred for 24 h at room temperature and aged for 2 days before functionalization with metal oxide additives.

To functionalize the parent polymeric materials (FT), 0.5 g of each of the following metal oxide agents including aluminum oxide (FT-Al), calcium oxide (FT-Ca), zinc oxide (FT-Zn), magnesium oxide (FT-Mg) or molybdenum oxide (FT-Mo), was individually loaded to a 10 mL of the FT matrix in 5 separate vials. The metal oxide-functionalized polymeric solutions were sonicated for 1 h, and the vials were labeled accordingly. The sol-gel reaction conditions, material ratios of the reactant, and the concentration of the loaded metal oxides were tested to ensure maximum long-standing stability and corrosion protection properties.

EXAMPLE 3

Coating Procedure

The developed sol-gel coating formulations were used to coat S-35 mild steel Q-panels (Q-Lab Company, USA, 76×127×0.8 mm dimension, used as received) using a K101 control coater (UK). The panels were cleaned ultrasonically for 10 min using absolute ethanol and air-dried prior to being used. The thicknesses of the produced films (approximately 50 µm) were controlled using the blue metal bar attached to the instrument. The coated samples were dried for 24 h under ambient air and at room temperature.

EXAMPLE 4

Characterization of Coatings

Electrochemical, thermogravimetric, and SEM analyses on all the developed mild steel hybrid-coated samples were conducted using similar instrumentations and procedures reported in a previous study [R. K. Suleiman, T. A. Saleh, O. C. S. Al Hamouz, M. B. Ibrahim, A. A. Sorour, B. El Ali, Corrosion and fouling protection performance of biocide-embedded hybrid organosiloxane coatings on mild steel in a saline medium, Surf. Coatings Technol. 324 (2017) 526-535, incorporated herein by reference in its entirety]. The aqueous water contact angles on the surface of all mild steel hybrid-coated samples were measured three times at different positions using a contact angle meter (VCA OPTIMA, AST Products Inc. USA). The mean of three values was selected as a final value. A drop of water (10 µL) was dropped on the cured surface of coated substrates and was snapped instantly after locating.

Microindentation test with a pyramidal diamond Vickers indenter was carried out to determine coating micromechanical properties using CSM microindenter (MicroCombi Tester CSM Instruments, Switzerland). Indentation hardness (H) and indentation elastic modulus (E) were estimated from load-displacement curve according to Oliver and Pharr model. To measure these properties, a normal load of 20 mN was applied for 10 s dwell time at loading and unloading rates of 40 mN/min. The applied load was chosen to ensure that the penetration depth does not exceed 10% of the coating thickness.

An optical profilometer (Contour GT-K, Bruker Nano GmBH, USA) was used to measure the microscale roughness of the functionalized hybrid sol-gel coatings. Three-dimensional images of the coated samples were acquired by scanning an area of about 1.66 mm×2.2 mm (3.5 mm$^2$). Three images with a pixel resolution of 1632×786 were obtained from different locations on the coated specimens to calculate the arithmetic mean ($R_a$), root-mean-square ($R_q$), and peak-to-valley (PV) distance micro-roughness values.

Scratch resistance measurements on the coated samples were achieved using a CSM microindenter (MicroCombi Tester CSM Instruments, Switzerland) with a standard Rockwell C indenter having a 100 µm tip radius. The indenter was pressed against the coating with an initial applied load of 30 mN and then pulled across the coating surface with a progressive loading condition until the maximum applied load of 30 N was attained. The scratch test parameters utilized over a scanning length of 10 mm were 5 N/min loading rate and 10 mm/min scratch traverse speed, respectively. During the test, the normal load, penetration depth, acoustic emission (AE), frictional force and the coefficient of friction (COF) were measured. By combining the friction curve and the acoustic emission signal, the critical loads $L^c$ were determined, which was the load at which the adhesive failure of the coating occurs.

EXAMPLE 5

Description of the Coatings

The preparation of the hybrid FT polymeric sol-gel materials was achieved via hydrolysis/polycondensation sol-gel reactions of the TEOS, DMMOMS and APTMS silane precursors. These silane precursors were chosen as they might lead to hybrid polymer matrixes with desirable cross-link density properties [R. Suleiman, H. Dafalla, B. El Ali, Novel hybrid epoxy silicone materials as efficient anticorrosive coatings for mild steel, RSC Adv. 5 (2015) 39155-

39167; R. Suleiman, M. Estaitie, M. Mizanurahman, Hybrid organosiloxane coatings containing epoxide precursors for protecting mild steel against corrosion in a saline medium, J. Appl. Polym. Sci. 133 (2016); U. Eduok, R. Suleiman, M. Khaled, R. Akid, Enhancing water repellency and anticorrosion properties of a hybrid silica coating on mild steel, Prog. Org. Coatings. 93 (2016), 97-108; and R. Suleiman, Assessment of the anticorrosion and antifouling performances of a novel hybrid epoxy-siliconized coating, NACE—Int. Corros. Conf. Ser. 2 (2017) 1345-1355, each incorporated herein by reference in their entirety]. The obtained hybrid polymer matrix from the above silane precursors was allowed to react further with PDMS to further introduce hydrophobic and scratch resistance characteristics in the final formulation. The proposed organosilicon networks that might exist in FT are shown in FIG. 1.

The hybrid polymer matrix FT was functionalized with various metal oxides to prepare the sol-gel coating formulations. The obtained metal oxide-embedded hybrid sol-gel coating formulations were deposited on mild steel panels, and allowed to cure open to air at room temperature. The photo-digital images of the surfaces of cured coated panels (FIGS. 2A-2F) did not reveal the presence of any defects, mechanical cracks, or immediate corrosion inhomogeneity. The images also revealed the potential scalability of functionalized sol-gel coating formulations on large metal surfaces.

EXAMPLE 6

Thermal Characterization

Figure 3:
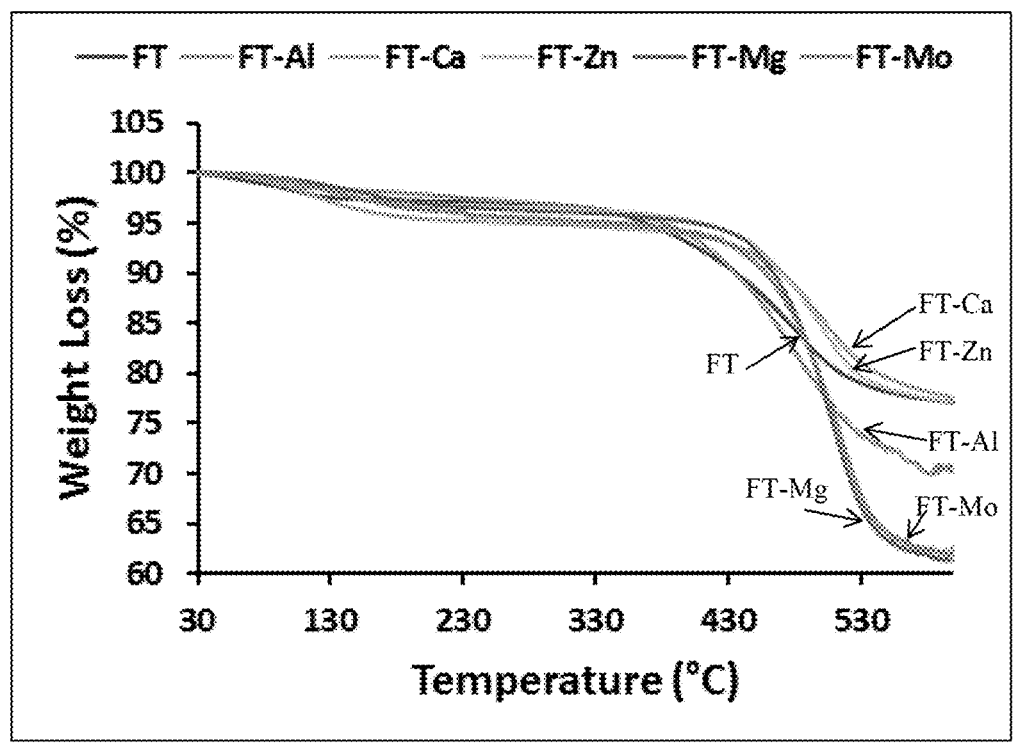
FIG. 3 is an overlay of thermogravimetric analysis curves of a cured hybrid polymer matrix (FT), and cured sol-gel coating formulations containing aluminum oxide particles (FT-Al), calcium oxide particles (FT-Ca), zinc oxide particles (FT-Zn), magnesium oxide particles (FT-Mg), and molybdenum oxide particles (FT-Mo), respectively.

Thermogravimetric analysis (TGA) was conducted on all cured metal oxide-containing sol-gel coating formulations and the results are depicted in FIG. 3. The thermal behavior of a hybrid coating is a key factor for its thermal and/or oxidative stability which ultimately indicates its application property as a protective coating. The TGA curves in FIG. 3 indicated that the embedment of CaO and ZnO metal oxides each yielded a minor enhancement in the thermal stability of the hybrid polymer FT while a noticeable reduction in thermal stability was observed with other embedded metal oxides. Nevertheless, the weight-loss behaviors of all samples were very similar. The attributes for the weight losses at various temperature intervals were reported for similar hybrid sol-gel materials in the literature [R. Suleiman, M. Estaitie, M. Mizanurahman, Hybrid organosiloxane coatings containing epoxide precursors for protecting mild steel against corrosion in a saline medium, J. Appl. Polym. Sci. 133 (2016); Y.-H. Han, A. Taylor, M. D. Mantle, K. M. Knowles, UV curing of organic-inorganic hybrid coating materials, J. Sol-Gel Sci. Technol. 43 (2007) 111-123; and P. Rodič, J. Iskra, I. Milošev, Study of a sol-gel process in the preparation of hybrid coatings for corrosion protection using FTIR and 1H NMR methods, J. Non. Cryst. Solids. 396-397 (2014) 25-35, each incorporated herein by reference in their entirety].

EXAMPLE 7

Contact Angle Measurement (CAM)

Figure 4:
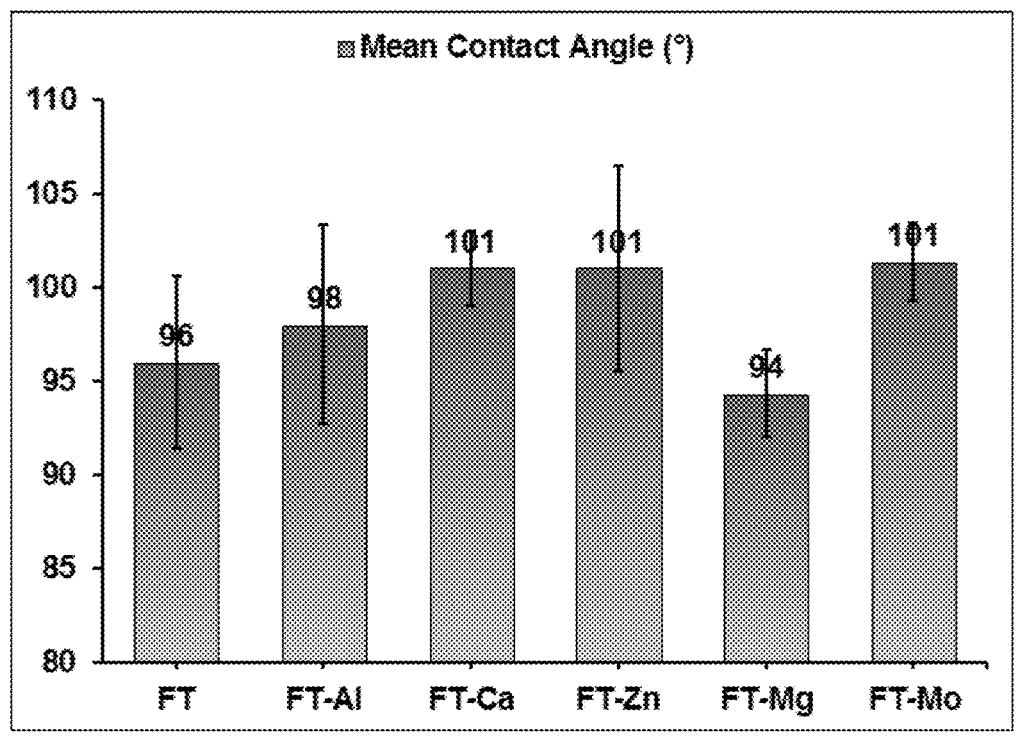
FIG. 4 is a graph illustrating mean water contact angles of metal substrates separately coated with the hybrid polymer matrix (FT), and sol-gel coating formulations containing aluminum oxide particles (FT-Al), calcium oxide particles (FT-Ca), zinc oxide particles (FT-Zn), magnesium oxide particles (FT-Mg), and molybdenum oxide particles (FT-Mo), respectively.

The aqueous CAM values for all cured sol-gel coating formulations on mild steel are illustrated in FIG. 4. The results revealed a hydrophobic nature of all surfaces having mean water contact angles of 94°-101°. The type of embedded metal oxide had a minor effect on the degree of hydrophobicity of the parent FT hybrid film. The level of the hydrophobicity of the FT coating is mainly attributed to the silane precursor DMMOS which contains a long C18 alkyl chain in its chemical structure, and is characterized by a low surface energy [U. Eduok, R, Suleiman, M. Khaled, R. Akid, Enhancing water repellency and anticorrosion properties of a hybrid silica coating on mild steel, Prog. Org. Coatings. 93 (2016), 97-108, incorporated herein by reference in its entirety].

EXAMPLE 8

Corrosion Behavior of the Hybrid Coatings

Figure 5A:
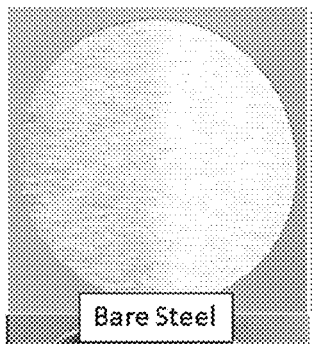
FIG. 5A shows a section of a bare metal substrate before immersion in saline solution.
Figure 5B:
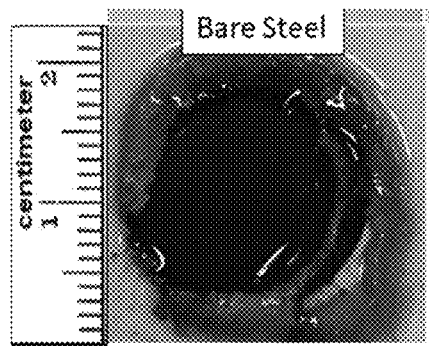
FIG. 5B shows the section in FIG. 5A after immersion in saline solution for 30 days.
Figure 5C:
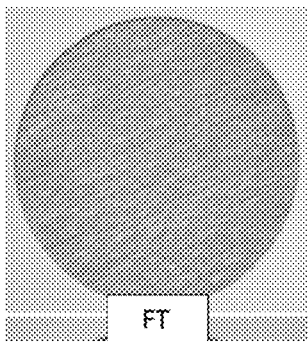
FIG. 5C shows a section of the metal substrate of FIG. 2A (FT) before immersion in saline solution.
Figure 5D:
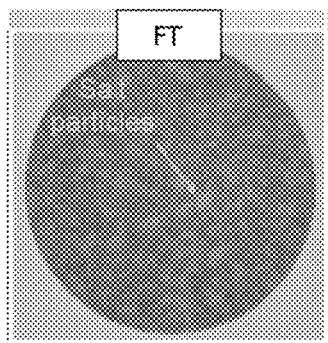
FIG. 5D shows the section in FIG. 5C after immersion in saline solution for 30 days.
Figure 5E:
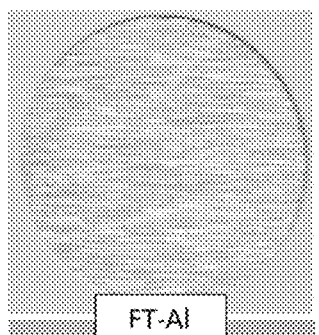
FIG. 5E shows a section of the metal substrate of FIG. 2B (FT-Al) before immersion in saline solution.
Figure 5F:
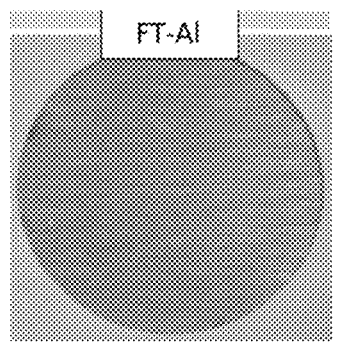
FIG. 5F shows the section in FIG. 5E after immersion in saline solution for 30 days.
Figure 5G:
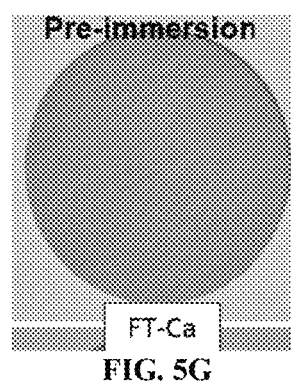
FIG. 5G shows a section of the metal substrate of FIG. 2C (FT-Ca) before immersion in saline solution.
Figure 5H:
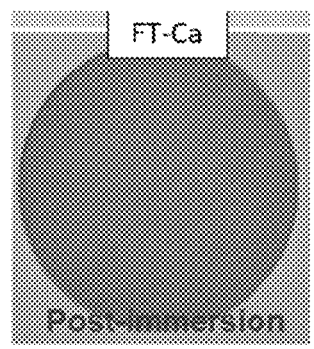
FIG. 5H shows the section in FIG. 5G after immersion in saline solution for 30 days.
Figure 5I:
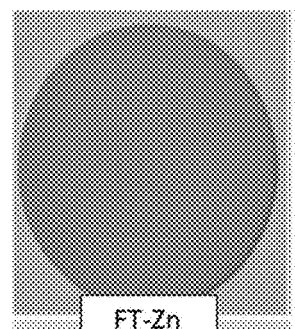
FIG. 5I shows a section of the metal substrate of FIG. 2D (FT-Zn) before immersion in saline solution.
Figure 5J:
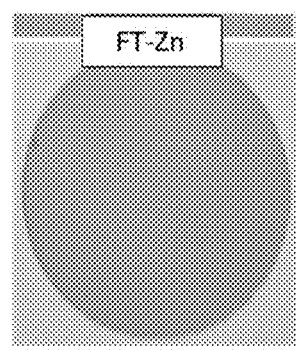
FIG. 5J shows the section in FIG. 5I after immersion in saline solution for 30 days.
Figure 5K:
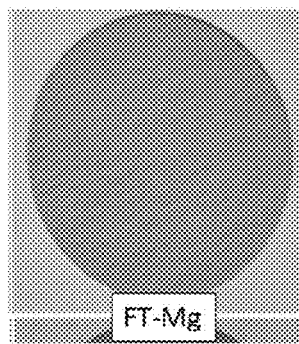
FIG. 5K shows a section of the metal substrate of FIG. 2E (FT-Mg) before immersion in saline solution.
Figure 5L:
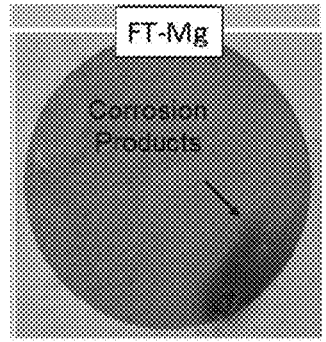
FIG. 5L shows the section in FIG. 5K after immersion in saline solution for 30 days.
Figure 5M:
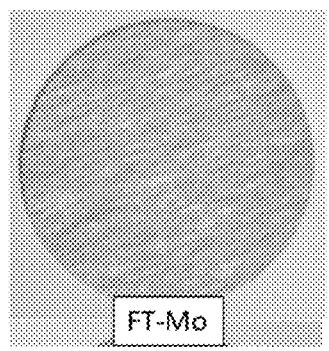
FIG. 5M shows a section of the metal substrate of FIG. 2F (FT-Mo) before immersion in saline solution.
Figure 5N:
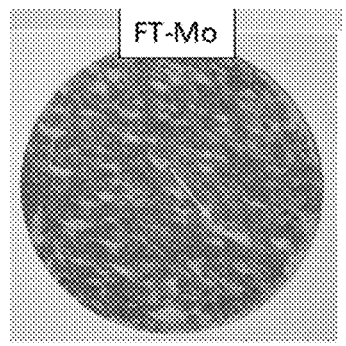
FIG. 5N shows the section in FIG. 5M after immersion in saline solution for 30 days.

To assess the corrosion protection behavior of the developed sol-gel coating formulations disclosed herein, the mild steel hybrid coated panels were continuously exposed to a 3.5 wt % NaCl medium followed by undergoing electrochemical impedance spectroscopy (EIS), morphological and scratch-resistance analyses in addition to visual inspection of the coated panels. The photo-digital images of all exposed metal oxide-embedded coated samples at 30 days (depicted in FIGS. 5A-5N) revealed promising corrosion protection performances on the surface of all samples except for sample FT-Mg, which exhibited a general corrosion behavior indicative of a less crosslink density or homogeneity properties of this sol-gel coating formulation. The surface of samples FT-Al, FT-Ca, and FT-Zn appeared very clean and intact while the surface of FT and FT-Mo had some attached salt particles.

It is worth mentioning that the addition of metal oxides before the hydrolysis/polycondensation of the silane precursors yielded hybrid polymer formulations with lower corrosion protection performances compared to the sol-gel coating formulations described above.

The corrosion protection performances of the metal oxide-embedded hybrid coated samples were assessed and compared further using the EIS technique, which is one of the most sophisticated, informative and routinely-used technique in characterizing the protection efficiency of all type of coatings [I. Santana, A. Pepe, W. Schreiner, S. Pellice, S. Ceré, Hybrid sol-gel coatings containing clay nanoparticles for corrosion protection of mild steel, Electrochim. Acta. 203 (2016) 396-403; H.-Y. Su, P.-L. Chen, C.-S. Lin, Sol-gel coatings doped with organosilane and cerium to improve the properties of hot-dip galvanized steel, Corros. Sci. 102 (2016) 63-71; and U. Eduok, R. Suleiman, J. Gittens, M. Khaled, T. J. Smith, R. Akid, B. El Ali, A. Khalil, Anticorrosion/antifouling properties of bacterial spore-loaded sol-gel type coating for mild steel in saline marine condition: a case of thermophilic strain of Bacillus licheniformis, RSC Adv. 5 (2015), each incorporated herein by reference in their entirety]. The technique can detect any changes occurred on the surface of coated metals even after a short time of exposure to the electrolytic solution.

Figure 6:
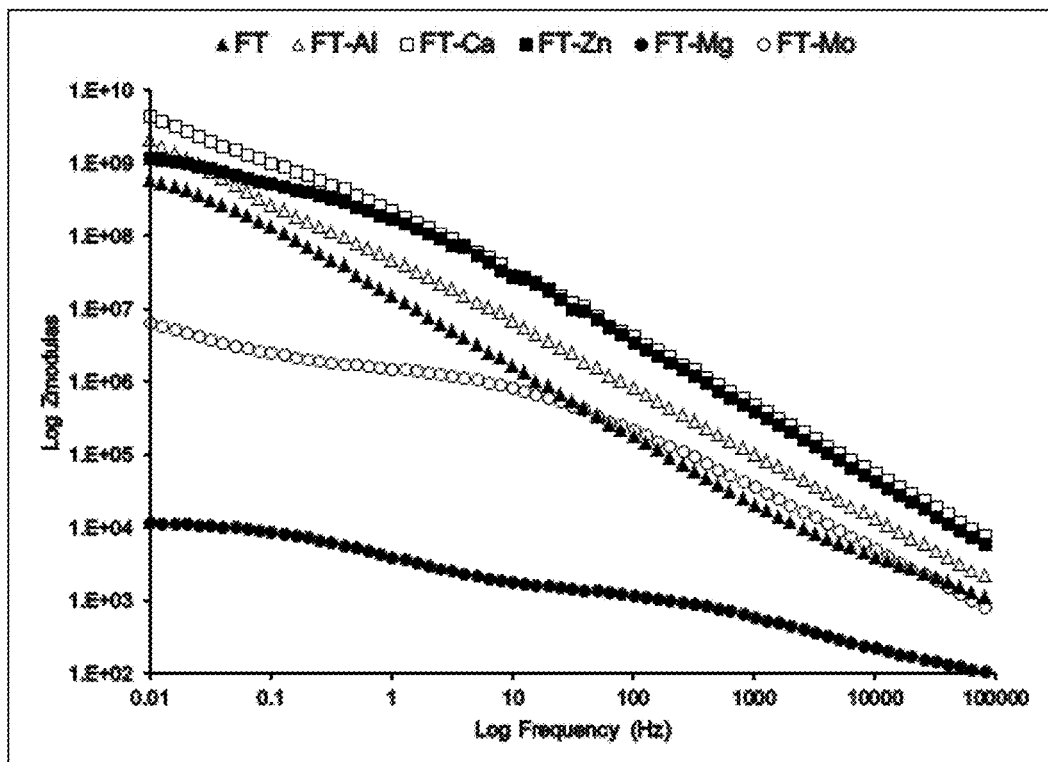
FIG. 6 is an overlay of Bode plots of metal substrates of FIGS. 2A (FT), 2B (FT-Al), 2C (FT-Ca), 2D (FT-Zn), 2E (FT-Mg), and 2F (FT-Mo) after immersion in saline solution for 30 days.

FIG. 6 depicts the EIS Bode plots for the mild steel-coated samples after 30 days of exposure to the 3.5 wt % NaCl solution. Samples FT-Al, FT-Ca, and FT-Zn had high impedance values ($>10^9 \Omega$), which indicated considerable barrier properties for these sol-gel coating formulations after the relatively long exposure time to the saline medium. Moreover, the impedance values for the above noted samples were higher than that of the FT sample, which demonstrated an advantageous role of the embedded metal oxides in these samples in enhancing the barrier properties of the bulk FT sample. On the other hand, panels coated with formulations containing $MoO_3$ and MgO additives demonstrated lower impedance values than FT sample, although the impedance value for the FT-Mo sample was still considerably high ($\sim 10^7 \Omega$). Sample FT-Mg had the lowest impedance value ($2\times10^4\Omega$), which explains the failure of this coating in protecting the steel surface shown in FIG. 5L.

Figure 7:
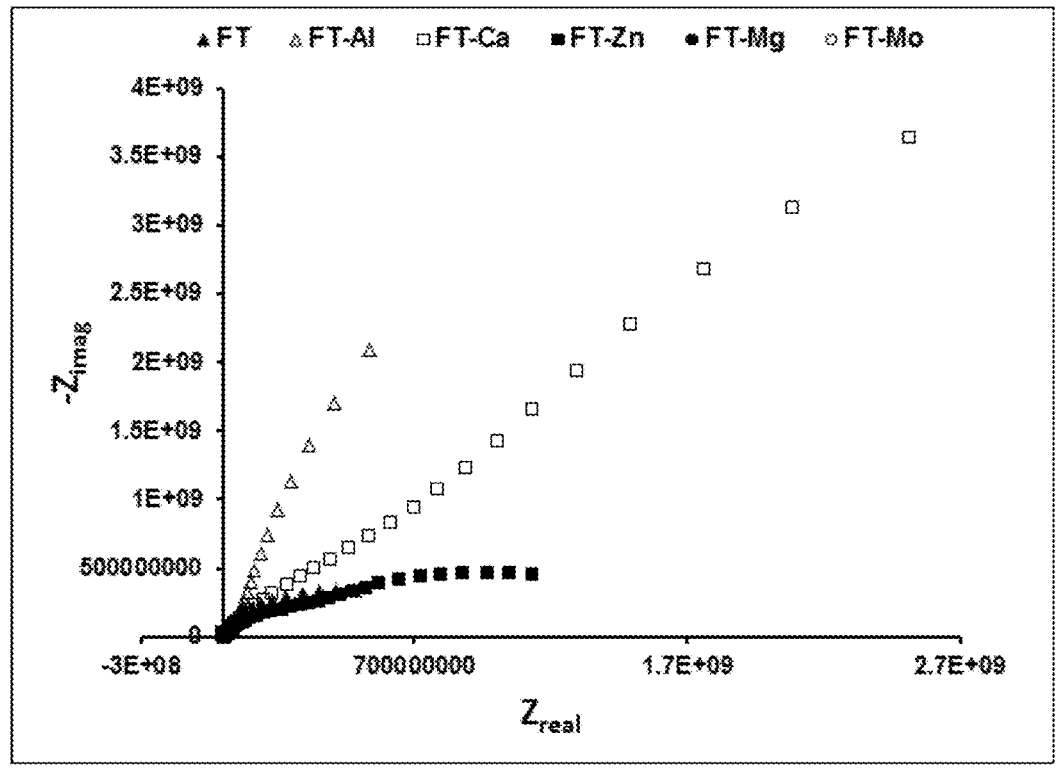
FIG. 7 is an overlay of Nyquist plots of metal substrates of FIGS. 2A (FT), 2B (FT-Al), 2C (FT-Ca), 2D (FT-Zn), 2E (FT-Mg), and 2F (FT-Mo) after immersion in saline solution for 30 days.

The EIS Nyquist data for the exposed coated mild steel samples were also collected and plotted in FIG. 7. The Nyquist plot for the FT-Ca showed two capacitive arcs including one for the sol-gel coating and the other associated with the charge transfer process at the steel surface. This behavior indicates a great capability for this coating to prohibit the passage of corrosive chloride ions to the steel surface [R. Mohammad Suleiman, Corrosion protective performance of epoxy-amino branched polydimethylsiloxane hybrid coatings on carbon steel, Anti-Corrosion Methods Mater. 61 (2014) 423-430, incorporated herein by reference in its entirety]. In addition to FT-Ca, samples FT-Al and FT-Zn demonstrated wider semi-circles (better impedance values) comparing to FT and other metal oxide-functionalized sol-gel formulations. The overall visual inspection and EIS results support that hybrid sol-gel coatings loaded with certain metal oxides have shown enhanced corrosion protection of the metal substrate.

EXAMPLE 9

Surface Morphology of the Coated Samples

Figure 8A:
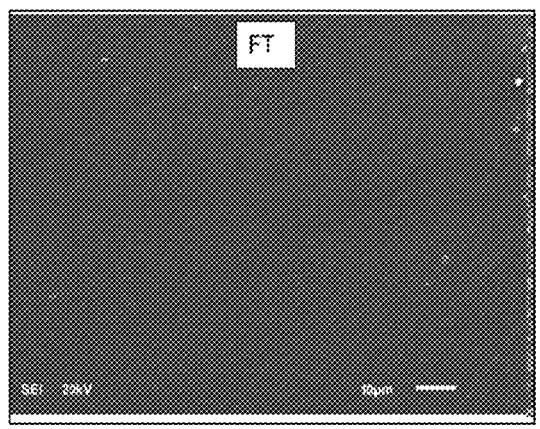
FIG. 8A is a scanning electron microscope (SEM) image of a top surface of the metal substrate of FIG. 2A (FT) after immersion in saline solution for 30 days.
Figure 8B:
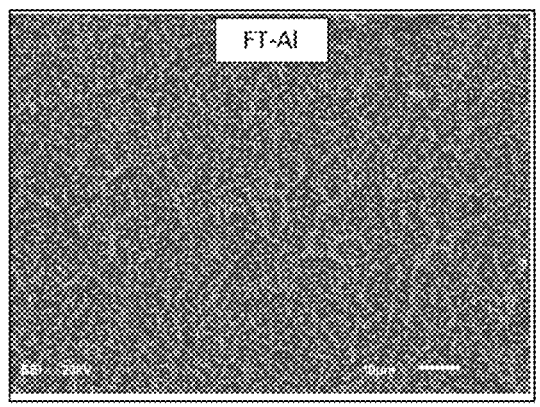
FIG. 8B is an SEM image of a top surface of the metal substrate of FIG. 2B (FT-Al) after immersion in saline solution for 30 days.
Figure 8C:
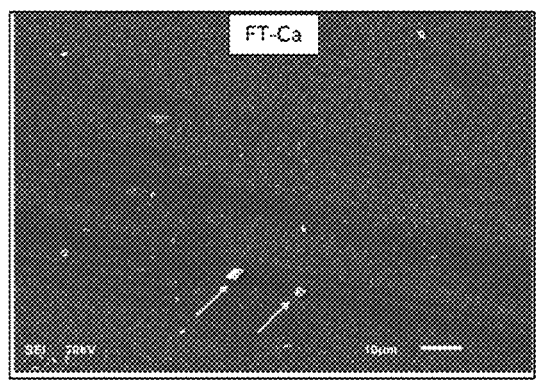
FIG. 8C is an SEM image of a top surface of the metal substrate of FIG. 2C (FT-Ca) after immersion in saline solution for 30 days.
Figure 8D:
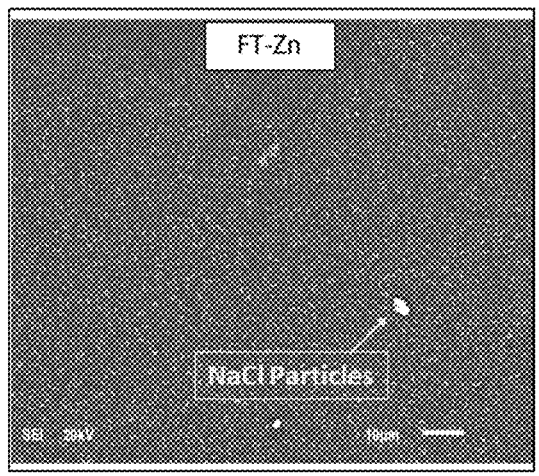
FIG. 8D is an SEM image of a top surface of the metal substrate of FIG. 2D (FT-Zn) after immersion in saline solution for 30 days.
Figure 8E:
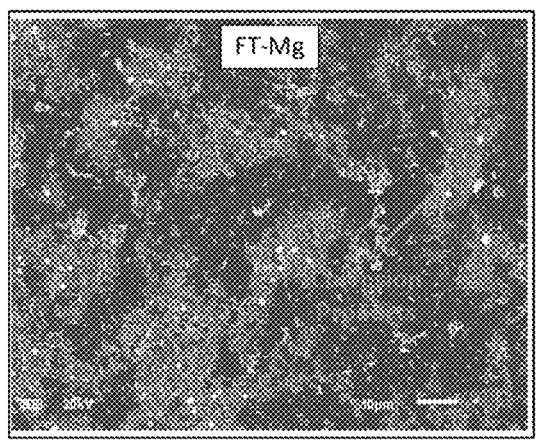
FIG. 8E is an SEM image of a top surface of the metal substrate of FIG. 2E (FT-Mg) after immersion in saline solution for 30 days.
Figure 8F:
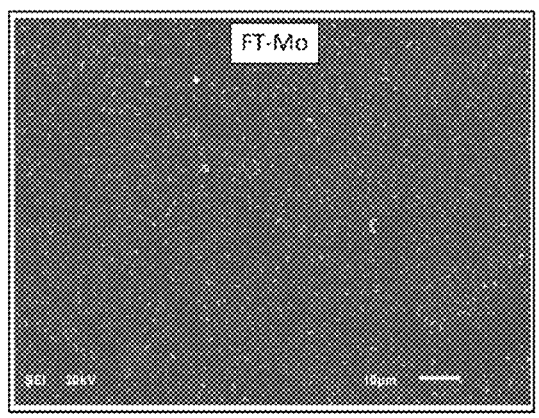
FIG. 8F is an SEM image of a top surface of the metal substrate of FIG. 2F (FT-Mo) after immersion in saline solution for 30 days.

The SEM images of the top surface morphologies of FT coating matrices with or without metal oxide particles on mild steel after 30 days of continuous exposure to a 3.5 wt % NaCl electrolytic solution are shown in FIGS. 8A-8F. All coatings showed a homogeneous and uniform surface with a minor salt precipitation observed on the surface of the FT-Ca and FT-Zn samples (FIGS. 8C and 8D). The accumulation of corrosion products were observed on the surface of the FT-Mg sample, which indicates the passage of the corrosive chloride ions to the steel surface and explains the weak corrosion protection performance of this sample shown in FIG. 5L.

Figure 9:
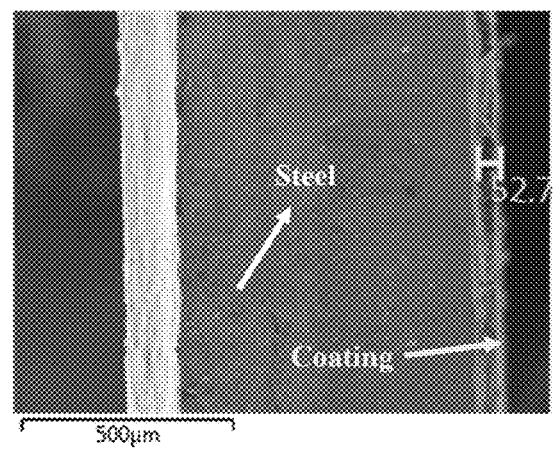
FIG. 9 is an SEM image of a cross-section of the metal substrate of FIG. 2A (FT) after immersion in saline solution for 30 days.

The SEM image of a cross-section of the FT hybrid coating shown in FIG. 9 indicated a dense, homogeneous, and crack-free microstructure with a minor rapture in the coating layer which occurred during the sample preparation. The image also revealed that the coating was approximately 50 µm thick and bonded very well to the surface of the metal substrate.

Figure 10:
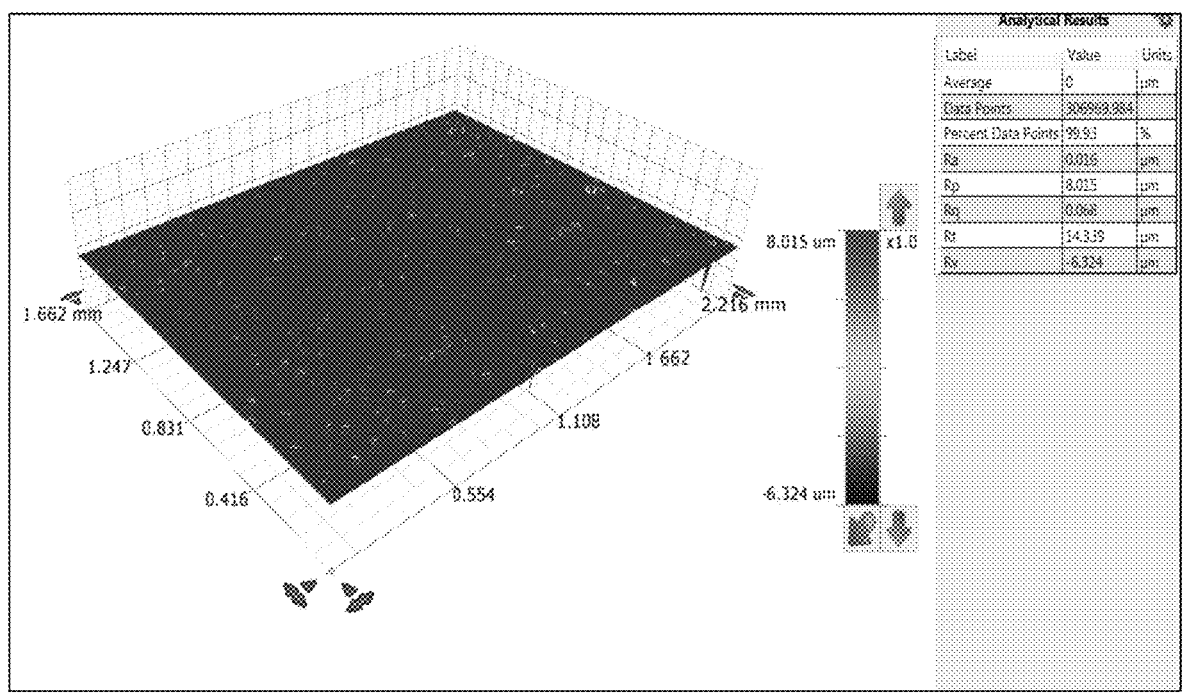
FIG. 10 is a surface roughness optical image of the metal substrate of FIG. 2F (FT-Mo).

To get more insight on the morphology and homogeneity of the sol-gel coating formulations on mild steel substrate, the surface roughness of the surface of all coated samples were measured. The obtained values of the root mean square height of the surface ($R_q$), the arithmetic average height of the surface ($R_a$) and the maximum height of peaks ($R_p$) are summarized in Table 2. The optical images of the surface roughness of the FT-Mo sample (shown here as an example) are depicted in FIG. 10. The surface roughness data reveal the existence of a synergistic effect of the added metal oxide with the FT bulk coating, as no major agglomeration of the metal oxide particles is observed on the surface of all coated samples [X. Zhang, L. Hu, D. Sun, Nanoindentation and nanoscratch profiles of hybrid films based on (γ-methacrylpropyl)trimethoxysilane and tetraethoxysilane, Acta Mater. 54 (2006) 5469-5475, incorporated herein by reference in its entirely]. The morphology of the surface of FT-Mo sample appeared to be more homogeneous with a "co-solubility" structure compared to other samples.

TABLE 2

Surface roughness assessment of the surfaces of all hybrid functionalized coated samples

| Sample | $R_q$ (µm) | Ra (µm) | $R_p$ (µm) |
|---|---|---|---|
| FT | 8.846 | 6.270 | 51.989 |
| FT-Al | 3.254 | 2.622 | 23.273 |
| FT-Ca | 7.523 | 5.758 | 47.459 |
| FT-Zn | 1.120 | 0.631 | 7.409 |
| FT-Mg | 4.921 | 4.002 | 23.834 |
| FT-Mo | 0.068 | 0.016 | 8.015 |

EXAMPLE 10

Vickers Ultra-Microhardness of All Coated Samples

Table 3 summarizes the Vickers hardness numbers (VHN) of all the metal oxide-loaded FT coatings on steel. Added metal oxides all enhanced the hardness property of the parent FT coating. Interestingly, sample FT-Mo showed the highest hardness properties, which indicated a better distribution and synergy of the molybdenum oxide particles with the hybrid silica network in FT [R. Suleiman, H. Dafalla, B. El Ali, Novel hybrid epoxy silicone materials as efficient anticorrosive coatings for mild steel, RSC Adv. 5 (2015) 39155-39167, incorporated herein by reference in its entirety].

TABLE 3

Vickers hardness (in VHN at 20 mN) of all coating matrices on steel

| Sample | FT | FT-Al | FT-Ca | FT-Zn | FT-Mg | FT-Mo |
|---|---|---|---|---|---|---|
| Mean HVN | 11.02 | 14.60 | 15.48 | 13.89 | 25.10 | 27.78 |
| Standard deviation | 1.81 | 1.26 | 0.90 | 1.10 | 1.77 | 2.40 |

EXAMPLE 11

Critical Load Testing of All Coated Samples

Critical load ($L_c$) testing of all hybrid sol-gel coating formulations was conducted and the obtained values are recorded in Table 4. The results highlight the advantageous contribution of the embedded metal oxides on the adhesion strength of the FT parent coating. Similar to the surface roughness and microhardness results illustrated above, FT-Mo sample exhibited the maximum $L_c$ value among all other formulations, which indicated an excellent adhesion property of this coating to the steel surface.

TABLE 4

Critical load ($L_c$) for the developed sol-gel coating formulation-coated mild steel samples

| Sample | FT | FT-Al | FT-Ca | FT-Zn | FT-Mg | FT-Mo |
|---|---|---|---|---|---|---|
| $L_c$/Failure load (N) | 0.276 | 1 | 0.513 | 0.815 | 0.293 | 2.39 |
| Standard deviation | 0.038 | 0.041 | 0.025 | 0.064 | 0.021 | 0.191 |

EXAMPLE 12

Advantages

Hybrid silica coating derived from TEOS, DMMOMS, APTMS and PDMS precursors can be prepared by a sol-gel process and used successfully as a hybrid matrix to load different metal oxides. It was observed that the addition of metal oxides ($Al_2O_3$, CaO, ZnO, and $MoO_3$) contributed to enhanced corrosion protection and scratch resistance properties of the parent FT coating. As revealed by SEM analyses, the surfaces of all cured mild steel-coated samples were free from cracks or pores. The hydrophobic character of these surfaces could be attributed to the long C18 alkyl chain in the structure of the parent coating FT. The results showed that the formulation containing $MoO_3$ has an optimum combined barrier, mechanical and adherence properties on mild steel substrates among all sol-gel coating formulations, which gives a potential utilization of this formulation in industrial applications.

The final thermal, mechanical and corrosion protection properties of the sol-gel coating formulations on mild steel substrate exposed to a saline medium were studied. In order to avoid the production of randomly mixed oxide aerogels and attain more control on the structure of the synthesized hybrid polymer, a preparation strategy of adding the metal oxides after achieving a complete sol-gel synthesis of the hybrid parent coating was utilized.

These new sol-gel coating formulations could be of high interest to most metal processing, petrochemical, refinery, chemical feedstock, and coating industry. These coating materials can be considered as a potential matrix for the encapsulation of various additives like clays, corrosion inhibitors, and bacteria which can lead to materials with promising mechanical, barrier, and antibacterial properties.

The invention claimed is:

1. A sol-gel coating formulation, comprising:
 a hybrid polymer matrix, which is a reacted form of a resin composition comprising, as vol. % relative to a total resin composition volume, (i) to (v) totaling 100%:
 (i) 15 to 30% of at least one tetraalkylorthosilicate selected from the group consisting of tetramethyl orthosilicate, tetraethyl orthosilicate, tetrapropyl orthosilicate, tetraisopropyl orthosilicate, and tetrabutyl orthosilicate;
 (ii) 15 to 30% of at least one aminoalkylsilane selected from the group consisting of (3-aminopropyl)-trimethoxysilane, (3-aminopropyl)-triethoxysilane, (3-aminopropyl)-dimethoxy-methylsilane, 3-aminopropyl)-diethoxy-methylsilane, (3-aminopropyl)-dimethoxy-ethylsilane, (3-aminopropyl)-diethoxy-ethylsilane, trimethoxy [3-(methylamino)propyl]silane, [3-(N,N-dimethylamino)propyl]trimethoxysilane, and trimethoxy[3-(phenylamino)propyl]silane;
 (iii) 15 to 30% of at least one dialkoxysilane selected from the group consisting of dimethoxy-methyl-octadecylsilane, dimethoxy-methyl-octylsilane, dimethoxy-methyl(3,3,3-trifluoropropyl)silane, chloromethyl (methyl)dimethoxysilane, chloromethyl(methyl) diethoxysilane, 3-mercaptopropyl(dimethoxy) methylsilane, diisobutyldimethoxysilane, dicyclopentyl(dimethoxy)silane, dimethoxymethylvinylsilane, 3-glycidyloxypropyldiethoxymethylsilane, and 3-glycidoxypropyldimethoxymethylsilane;
 (iv) 15 to 30% of a silanol terminated polydimethylsiloxane of formula (V)

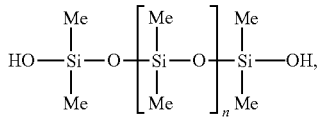

(V)

n, as degree of polymerization, being in a range of from 6 to 20; and
 (v) 1 to 5% of an aqueous solution comprising nitric acid at a concentration in a range of from 0.01 to 0.5 M; and
 metal oxide particles embedded in the hybrid polymer matrix at a concentration in a range of from 0.01 to 0.5 g/mL, relative to a total volume of the hybrid polymer matrix, wherein the metal oxide particles are at least one selected from the group consisting of aluminum oxide, calcium oxide, zinc oxide, magnesium oxide, and molybdenum oxide,
 wherein the silanol terminated polydimethylsiloxane has a number average molecular weight in a range of from 300 to 1,000, and
 wherein the sol-gel coating formulation has, as a cured coating on a metal substrate, an impedance value in a range of $1\times10^4$ to $1\times10^{10}$ Ω after exposure to a saline solution for a period in a range of from 10 to 40 days.

2. The formulation of claim 1, wherein the aminoalkylsilane is a (3-aminopropyl)trialkoxysilane and the dialkoxysilane is a dialkoxy-alkyl-octadecylsilane.

3. The formulation of claim 1, wherein the tetraalkylorthosilicate is tetraethylorthosilicate.

4. The formulation of claim 1, wherein the aminoalkylsilane is (3-aminopropyl)trimethoxysilane.

5. The formulation of claim 1, wherein the dialkoxysilane is dimethoxy-methyl-octadecylsilane.

6. The formulation of claim 1, wherein the silanol terminated polydimethylsiloxane has a number average molecular weight in a range of from 500 to 800 g/mol.

7. The formulation of claim 1, wherein the metal oxide particles comprise molybdenum oxide.

8. The formulation of claim 1, wherein the tetraalkylorthosilicate comprises tetraethylorthosilicate,
 wherein the aminoalkylsilane comprises (3-aminopropyl)trimethoxysilane,
 wherein the dialkoxysilane comprises dimethoxy-methyl-octadecylsilane,
 wherein the silanol terminated polydimethylsiloxane has a number average molecular weight in a range of from 600 to 700 g/mol, and
 wherein the aqueous solution comprises the nitric acid at a molar concentration in a range of from 0.05 to 0.4 M.

9. The formulation of claim 8, wherein, in vol. % relative to a total resin composition volume:
 the tetraethylorthosilicate is present in a range of from 15 to 25%;
 the (3-aminopropyl)trimethoxysilane is present in a range of from 15 to 25%;
 the dimethoxy-methyl-octadecylsilane is present in a range of from 15 to 25%;
 the silanol terminated polydimethylsiloxane is present in a range of from 15 to 25%, the silanol terminated polydimethylsiloxane having a number average molecular weight in a range of from 500 to 800 g/mol; and
 the aqueous solution in a range of from 2.5 to 3.5%.

10. The formulation of claim 1, wherein, in vol. % relative to a total resin composition volume:
 the tetraethylorthosilicate is present in a range of from 18 to 25%;
 the (3-aminopropyl)trimethoxysilane is present in a range of from 18 to 25%;
 the dimethoxy-methyl-octadecylsilane is present in a range of from 18 to 25%;
 the silanol terminated polydimethylsiloxane is present in a range of from 18 to 25%, the silanol terminated polydimethylsiloxane having a number average molecular weight in a range of from 500 to 800 g/mol; and the aqueous solution in a range of from 2 to 4%, the aqueous solution comprising nitric acid at a molar concentration in a range of from 0.03 to 0.2 M, wherein the metal oxide particles are at least one selected from the group consisting of aluminum oxide, calcium oxide, zinc oxide, magnesium oxide, and molybdenum oxide, wherein the metal oxide particles are embedded in the hybrid polymer matrix at a concentration in a range of from 0.02 to 0.1 g/ML, relative to a total volume of the hybrid polymer matrix.

11. The formulation of claim 1, wherein the resin composition further comprises a non-aqueous solvent.

12. The formulation of claim 11, wherein the non-aqueous solvent is isopropyl alcohol.

13. An anticorrosive coated metal substrate, comprising:
a metal substrate; and
a layer of the sol-gel coating formulation of claim 1, in cured form, disposed on the metal substrate;
wherein the layer has a thickness in a range of from 10 to 200 μm.

14. The substrate of claim 13, having a mean water contact angle in a range of from 92 to 105°.

15. The substrate of claim 13, having
a root mean square height of surface roughness ($R_q$) in a range of from 0.05 to 8 μm,
an arithmetic average height of surface roughness ($R_a$) in a range of from 0.01 to 6.0 μm, and
a maximum height of peaks surface roughness ($R_p$) in a range of from 6 to 50 μm, wherein the metal substrate is steel.

16. The anticorrosive coated metal substrate of claim 13, which has a Vickers hardness number in a range of from 12 to 30.

17. The anticorrosive coated metal substrate of claim 13, which has a critical load in a range of from 0.2 to 2.5 N.

18. The anticorrosive coated metal substrate of claim 13, which has an impedance value in a range of $1\times10^4$ to $1\times10^{10}$ Ω after exposure to a saline solution for a period in a range of from 10 to 40 days.

19. A method of preparing the sol-gel coating formulation of claim 1, the method comprising:
mixing the tetraalkylorthosilicate, the aminoalkylsilane, and the dialkoxysilane with the aqueous solution of the inorganic acid to form a first mixture;
mixing the first mixture with the silanol terminated polydimethylsiloxane to form a second mixture;
aging the second mixture at a temperature in a range of from 15 to 40° C. to form a hybrid polymer matrix; and
mixing the hybrid polymer matrix with the metal oxide particles thereby forming the sol-gel coating formulation.

20. The formulation of claim 1 haying, as a cured coating on a metal substrate,
a mean water contact angle in a range of from 92 to 105°,
a root mean square height of surface roughness ($R_q$) in a range of from 0.05 to 8 μm,
an arithmetic average height of surface roughness ($R_a$) in a range of from 0.01 to 6.0 μm,
a maximum height of peaks surface roughness ($R_p$) in a range of from 6 to 50 μm, and
a Vickers hardness number in a range of from 12 to 30, and
wherein the metal oxide particles have an average diameter in a rangeof from 1 to 80 μm.

* * * * *